US009244802B2

(12) United States Patent
Yalovsky et al.

(10) Patent No.: US 9,244,802 B2
(45) Date of Patent: Jan. 26, 2016

(54) RESOURCE USER INTERFACE

(75) Inventors: Mark Yalovsky, Seattle, WA (US);
Christina L. Rhodes, Kirkland, WA (US); Rolf A. Ebeling, Kirkland, WA (US); Peter Seraphim Ponomarev, Seattle, WA (US); Matthew P. Duignan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/229,693

(22) Filed: Sep. 10, 2011

(65) Prior Publication Data
US 2013/0067381 A1 Mar. 14, 2013

(51) Int. Cl.
*G06F 11/32* (2006.01)
*G06F 3/048* (2013.01)
*G06F 3/0481* (2013.01)
*G06F 3/0482* (2013.01)
*G06F 3/0483* (2013.01)

(52) U.S. Cl.
CPC .............. *G06F 11/321* (2013.01); *G06F 3/048* (2013.01); *G06F 3/0481* (2013.01); *G06F 3/0482* (2013.01); *G06F 3/0483* (2013.01); *G06F 3/04817* (2013.01)

(58) Field of Classification Search
CPC .... G06F 11/30–11/328; G06F 3/048–3/04847
USPC ........................................................ 715/772
See application file for complete search history.

(56) References Cited

U.S. PATENT DOCUMENTS

| | | | |
|---|---|---|---|
| 4,823,283 A | 4/1989 | Diehm et al. | |
| 5,045,997 A | 9/1991 | Watanabe | |
| 5,046,001 A | 9/1991 | Barker et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |

(Continued)

FOREIGN PATENT DOCUMENTS

| | | |
|---|---|---|
| CN | 1326564 | 12/2001 |
| CN | 1734440 | 2/2006 |

(Continued)

OTHER PUBLICATIONS

Using Microsoft Windows 7, Chapter 11 Managing and Monitoring Windows 7, by J. Peter Bruzzese, Que Publishing, May 5, 2010.*

(Continued)

*Primary Examiner* — Tuyetlien Tran
*Assistant Examiner* — Patrick Ramsey
(74) *Attorney, Agent, or Firm* — John Jardine; Kate Drakos; Micky Minhas

(57) ABSTRACT

This document describes techniques for presenting a resource user interface. These techniques present, in a summary section of a user interface, multiple selectable resource tiles that each include real-time and/or static information corresponding to one of multiple resources of a computing device. Each of the multiple selectable resource tiles are presented simultaneously, which enables a user to compare live, real-time resource usage for different resources of the computing device. Further, these techniques present, in a detailed view section of the user interface, additional real-time resource information and/or a real-time resource graph corresponding to a selected one of the multiple resources.

14 Claims, 5 Drawing Sheets

(56) References Cited

U.S. PATENT DOCUMENTS

| | | | |
|---|---|---|---|
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,506,951 A | 4/1996 | Ishikawa |
| 5,510,808 A | 4/1996 | Cina, Jr. et al. |
| 5,515,495 A | 5/1996 | Ikemoto |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,675,329 A | 10/1997 | Barker |
| 5,680,562 A | 10/1997 | Conrad et al. |
| 5,687,331 A | 11/1997 | Volk et al. |
| 5,712,995 A | 1/1998 | Cohn |
| 5,740,389 A | 4/1998 | Li et al. |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,847,706 A | 12/1998 | Kingsley |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,163,749 A | 12/2000 | McDonough et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,313,854 B1 | 11/2001 | Gibson |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,323 B1 * | 6/2003 | Jamieson et al. ............ 715/700 |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,880,132 B2 | 4/2005 | Uemura |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,194,506 B1 | 3/2007 | White et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |

(56) References Cited

U.S. PATENT DOCUMENTS

| | | |
|---|---|---|
| 7,388,578 B2 | 6/2008 | Tao |
| 7,403,191 B2 | 7/2008 | Sinclair |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,694,221 B2 | 4/2010 | Fortes |
| 7,702,683 B1 | 4/2010 | Kirshenbaum |
| 7,755,674 B2 | 7/2010 | Kaminaga |
| 7,792,925 B1 | 9/2010 | Werner et al. |
| 7,834,861 B2 | 11/2010 | Lee |
| 7,844,915 B2 | 11/2010 | Platzer et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,028,239 B1 | 9/2011 | Al-Hilali et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,279,241 B2 | 10/2012 | Fong |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,493,510 B2 | 7/2013 | Bryan et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,706,515 B2 | 4/2014 | Cobbs et al. |
| 8,830,270 B2 | 9/2014 | Zaman et al. |
| 8,893,033 B2 | 11/2014 | Donahue et al. |
| 8,922,575 B2 | 12/2014 | Garside et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 9,015,606 B2 | 4/2015 | Zaman et al. |
| 9,052,820 B2 | 6/2015 | Jarrett et al. |
| 9,104,307 B2 | 8/2015 | Jarrett et al. |
| 9,104,440 B2 | 8/2015 | Jarrett et al. |
| 9,141,262 B2 | 9/2015 | Nan et al. |
| 9,146,670 B2 | 9/2015 | Zaman et al. |
| 9,158,445 B2 | 10/2015 | Wong et al. |
| 9,213,468 | 12/2015 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0128359 A1 | 7/2004 | Horvitz et al. |
| 2004/0155908 A1 | 8/2004 | Wagner |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |

(56) References Cited

U.S. PATENT DOCUMENTS

| | | |
|---|---|---|
| 2004/0266491 A1 | 12/2004 | Howard et al. |
| 2005/0005241 A1 | 1/2005 | Hunleth et al. |
| 2005/0028208 A1 | 2/2005 | Ellis et al. |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060663 A1* | 3/2005 | Arkeketa et al. ............ 715/810 |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1* | 3/2006 | Krassovsky et al. .......... 717/127 |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156228 A1 | 7/2006 | Gallo et al. |
| 2006/0161863 A1 | 7/2006 | Gallo |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0227153 A1 | 10/2006 | Anwar et al. |
| 2006/0236264 A1 | 10/2006 | Cain et al. |
| 2006/0246955 A1 | 11/2006 | Nirhamo et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0143705 A1 | 6/2007 | Peters |
| 2007/0157089 A1 | 7/2007 | Van Os et al. |
| 2007/0157105 A1 | 7/2007 | Owens et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberthy |
| 2007/0281747 A1 | 12/2007 | Pletikosa |
| 2008/0005668 A1 | 1/2008 | Mavinkurve |
| 2008/0028294 A1 | 1/2008 | Sell et al. |
| 2008/0032681 A1 | 2/2008 | West |
| 2008/0034318 A1 | 2/2008 | Louch et al. |
| 2008/0036743 A1 | 2/2008 | Westerman et al. |

(56) References Cited

U.S. PATENT DOCUMENTS

| | | |
|---|---|---|
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0284798 A1 | 11/2008 | Weybrew et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058821 A1 | 3/2009 | Chaudhri |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0079740 A1 | 3/2009 | Fitzmaurice et al. |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0132942 A1 | 5/2009 | Santoro et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0171920 A1 | 7/2009 | Wade et al. |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaughnessy et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski |
| 2009/0327969 A1 | 12/2009 | Estrada |
| 2010/0008490 A1 | 1/2010 | Gharachorloo et al. |

(56) References Cited

U.S. PATENT DOCUMENTS

| | | |
|---|---|---|
| 2010/0010934 A1 | 1/2010 | Barry et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058248 A1 | 3/2010 | Park |
| 2010/0062811 A1 | 3/2010 | Park et al. |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0088641 A1 | 4/2010 | Choi |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0123737 A1 | 5/2010 | Williamson et al. |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0251167 A1 | 9/2010 | Deluca et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0281481 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295789 A1 | 11/2010 | Shin et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0138313 A1 | 6/2011 | Decker et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0181617 A1 | 7/2011 | Tsuda et al. |
| 2011/0202837 A1 | 8/2011 | Fong |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0258563 A1 | 10/2011 | Lincke |
| 2011/0276864 A1 | 11/2011 | Oules |
| 2011/0283188 A1 | 11/2011 | Farrenkopf et al. |
| 2011/0316884 A1 | 12/2011 | Giambalvo et al. |
| 2012/0005584 A1* | 1/2012 | Seago et al. .................. 715/738 |
| 2012/0009903 A1 | 1/2012 | Schultz et al. |
| 2012/0017162 A1 | 1/2012 | Khokhlov |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0081310 A1 | 4/2012 | Chrock et al. |
| 2012/0089950 A1 | 4/2012 | Tseng |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0162266 A1 | 6/2012 | Douglas et al. |
| 2012/0167008 A1 | 6/2012 | Zaman |
| 2012/0167011 A1 | 6/2012 | Zaman |

(56) References Cited

U.S. PATENT DOCUMENTS

| | | |
|---|---|---|
| 2012/0169593 A1 | 7/2012 | Mak et al. |
| 2012/0174005 A1 | 7/2012 | Deutsch |
| 2012/0174029 A1 | 7/2012 | Bastide et al. |
| 2012/0176401 A1 | 7/2012 | Hayward et al. |
| 2012/0179992 A1 | 7/2012 | Smuga |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0226971 A1 | 9/2012 | Tocchini et al. |
| 2012/0233571 A1 | 9/2012 | Wever et al. |
| 2012/0236035 A1 | 9/2012 | Kimura |
| 2012/0244841 A1 | 9/2012 | Teng |
| 2012/0254780 A1 | 10/2012 | Mouton |
| 2012/0265644 A1 | 10/2012 | Roa et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0311485 A1 | 12/2012 | Caliendo, Jr. et al. |
| 2012/0323992 A1 | 12/2012 | Brobst et al. |
| 2013/0031508 A1 | 1/2013 | Kodosky et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0093757 A1 | 4/2013 | Cornell |
| 2014/0033099 A1 | 1/2014 | Treitman et al. |
| 2014/0082552 A1 | 3/2014 | Zaman |
| 2014/0098108 A1 | 4/2014 | Fong et al. |
| 2014/0109008 A1 | 4/2014 | Zaman |
| 2015/0046829 A1 | 2/2015 | Donahue et al. |
| 2015/0058763 A1 | 2/2015 | Leonard et al. |
| 2015/0113476 A1 | 4/2015 | Deutsch et al. |
| 2015/0186376 A1 | 7/2015 | Garside et al. |
| 2015/0193403 A1 | 7/2015 | Zaman et al. |
| 2015/0317062 A1 | 11/2015 | Jarrett et al. |

FOREIGN PATENT DOCUMENTS

| | | |
|---|---|---|
| CN | 1902575 | 1/2007 |
| CN | 1904823 | 1/2007 |
| CN | 1930568 | 3/2007 |
| CN | 101036104 | 9/2007 |
| CN | 101114303 | 1/2008 |
| CN | 101578577 | 11/2009 |
| CN | 101809531 | 8/2010 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| EP | 0583060 | 2/1994 |
| EP | 1353505 | 10/2003 |
| EP | 1752868 | 2/2007 |
| EP | 1939718 | 7/2008 |
| EP | 2172836 | 4/2009 |
| EP | 2262193 | 12/2010 |
| EP | 2659347 | 11/2013 |
| GB | 2350991 | 12/2000 |
| JP | 2003513350 | 4/2003 |
| JP | 2004227393 | 8/2004 |
| JP | 2004357257 | 12/2004 |
| JP | 2006268849 | 10/2006 |
| JP | 2007058740 | 3/2007 |
| JP | 2007516496 | 6/2007 |
| JP | 2007195186 | 8/2007 |
| JP | 2008508600 | 3/2008 |
| JP | 2008527540 | 7/2008 |
| JP | 2009266192 | 11/2009 |
| JP | 2010039761 | 2/2010 |
| JP | 2010073099 | 4/2010 |
| JP | 2011048835 | 3/2011 |
| JP | 2011070525 | 4/2011 |
| JP | 2011516936 | 5/2011 |
| JP | 2012527684 | 11/2012 |
| JP | 2012256147 | 12/2012 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 102010005636 | 5/2010 |
| TW | 201023026 | 6/2010 |
| TW | 201037592 | 10/2010 |
| TW | I333157 | 11/2010 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2009158310 | 12/2009 |
| WO | WO-2010024969 | 3/2010 |
| WO | WO-2010036660 | 4/2010 |
| WO | WO-2010041826 | 4/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010119356 | 10/2010 |
| WO | WO-2010125451 | 11/2010 |
| WO | WO-2010134718 | 11/2010 |
| WO | WO-2010135155 | 11/2010 |
| WO | WO-2011041885 | 4/2011 |

OTHER PUBLICATIONS

Computerworld article, "Installing and tweaking Process Explorer part 2," by Michael Horowitz, May 23, 2010. Retrieved from Internet archive Wayback Machine.*

Windows XP Hacks, Second Edition, Chapter 13 Hardware, by Preston Gralla, O'Reilly Publishing, Feb. 2005.*

My Favorite Gadgets, System Monitor II download page, retrieved from Internet archive Wayback Machine. Dated per Wayback Machine crawl of Jun. 8, 2010.*

(56) References Cited

OTHER PUBLICATIONS

The Authoritative Dictionary of IEEE Standards Terms, 7th ed. IEEE Press, Dec. 2000.*
"Adobe Acrobat 8 Standard User Guide", Adobe Systems Incorporated,(2007),pp. 34 & 36.
"Advisory Action", U.S. Appl. No. 12/414,382, (Jan. 20, 2012),3 pages.
"Advisory Action", U.S. Appl. No. 12/433,605, (Apr. 5, 2012),3 pages.
"Alltel Adds Dedicated Search Key to Phones", Retrieved from: <http://www.phonescoop.com/news/item.php?n=2159> on Nov. 26, 2008., (Apr. 12, 2007),2 Pages.
"Android 2.3 User's Guide", AUG-2.3-103, Android mobile technology platform 2.3,(Dec. 13, 2010),380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007),11 pages.
"Ask Web Hosting", Retrieved from: http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.
"Basics of Your Device: Get Familiar with the Home Screen", Nokia USA—How to, retrieved from <http://www.nokia.ca/get-support-and-software/product-support/c6-01/how-to#> on May 11, 2011,3 pages.
"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Calc4M", Retrieved from: <http://www.hellebo.com/Calc4M.html> on Dec. 11, 2008, (Sep. 10, 2008),4 Pages.
"Content-Centric E-Mail Message Analysis in Litigation Document Reviews", Retrieved from:from: <http://www.busmanagement.com/article/Issue-14/Data-Management/Content-Centric-E-Mail-Message-Analysis-in-Litigation-Document-Reviews/> on May 6, 2009, (2009),5 Pages.
"Dial a number", Retrieved from: <http://www.phonespell.org/ialhelp.html> on Nov. 20, 2008, 1 page.
"DuoSense™ Multi-Touch Gestures", Retrieved from: <http://www.n-trig.com/Data/Uploads/Misc/DuoSenseMTG_final.pdf>, (Jul. 2008),4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),2 pages.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.
"Extended European Search Report", European Patent Application No. 09818253.8, (Apr. 10, 2012),7 pages.
"Final Office Action", U.S. Appl. No. 12/244,545, (Dec. 7, 2011),16 pages.
"Final Office Action", U.S. Appl. No. 12/244,545, (Sep. 7, 2012),23 pages.
"Final Office Action", U.S. Appl. No. 12/413,977, (Nov. 17, 2011),16 pages.
"Final Office Action", U.S. Appl. No. 12/414,382, (Dec. 23, 2011),7 pages.
"Final Office Action", U.S. Appl. No. 12/414,476, (Dec. 1, 2011),20 pages.
"Final Office Action", U.S. Appl. No. 12/433,605, (Feb. 3, 2012),11 pages.
"Final Office Action", U.S. Appl. No. 12/433,667, (Sep. 13, 2011),17 pages.
"Final Office Action", U.S. Appl. No. 12/469,458, (Nov. 17, 2011),15 pages.
"Final Office Action", U.S. Appl. No. 12/469,480, (Feb. 9, 2012),17 pages.
"Final Office Action", U.S. Appl. No. 12/484,799, (Apr. 30, 2012),13 pages.
"Final Office Action", U.S. Appl. No. 12/560,081, (Mar. 14, 2012),16 pages.
"Freeware.mobi", Retrieved from: <http://www.palmfreeware.mobi/download-palette.html> on Nov. 6, 2008, (Oct. 9, 2001),2 pages.
"How do you dial 1-800-Flowers", Retrieved from: <http://blogs.msdn.com/windowsmobile/archive/2007/02/06/how-do-you-dial-1-800-flowers.aspx> on Nov. 20, 2008, (Feb. 6, 2007),24 pages.
"HTC Shows HTC Snap with Snappy Email Feature", Retrieved from: <http://www.wirelessandmobilenews.com/smartphones/ on May 5, 2009>, (May 4, 2009),10 Pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008),11 pages.
"International Search Report and Written Opinion", International Application No. PCT/US2011/055514, (May 22, 2012),8 pages.
"International Search Report", Application No. PCT/US2010/028553, Application Filing Date: Mar. 24, 2010,(Nov. 9, 2010),9 pages.
"Internet Explorer Window Restrictions", Retrieved from: http://technet.microsoft.com/en-us/library/cc759517(WS.10).aspx on Jun. 28, 2011, Microsoft TechNet,5 pages.
"Introduction to Windows Touch", Retrieved from: <http://download.microsoft.com/download/a/d/f/adf1347d-08dc-41a4-9084-623b1194d4b2/Win7_touch docx> (Dec. 18, 2008),pp. 1-7.
"iPod touch User Guide for iPhone OS 3.0 Software", Apple Inc. ,(2009),153 pages.
"Keyboard (5)", Retrieved from: <http://landru.uwaterloo.ca/cgi-bin/man.cgi?section=5&topic=keyboard> on Dec. 11, 2008., (Aug. 11, 1997),8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x, (Aug. 16, 2007),2 pages.
"Live Photo Gallery—Getting Started—from Camera to Panorama", Retrieved from: <http://webdotwiz.spaces.live.com/blog/cns!2782760752B93233!1729.entry> on May 5, 2009., (Sep. 2008),7 Pages.
"MIDTB Tip Sheet: Book Courier", Retrieved from: <http://www.midtb.org/tipsbookcourier.htm> on Dec. 11, 2008., (Sep. 26, 2005),6 Pages.
"Mobile/UI/Designs/TouchScreen", Retrieved from: <https://wiki.mozilla.org/Mobile/UI/Designs/TouchScreen> on May 6, 2009., (Feb. 3, 2009),15 Pages.
"Multi-touch", Retrieved from <http://en.wikipedia.org/wiki/Multi-touch#Microsoft_Surface> on Apr. 24, 2009, (Apr. 17, 2009),8 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.
"Non-Final Office Action", U.S. Appl. No. 11/215,052, (Jun. 23, 2011),17 pages.
"Non-Final Office Action", U.S. Appl. No. 11/502,264, (Sep. 14, 2012),14 pages.
"Non-Final Office Action", U.S. Appl. No. 12/244,545, (Mar. 27, 2012),18 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/413,977, (Jul. 20, 2012),18 pages.
"Non-Final Office Action", U.S. Appl. No. 12/414,382, (Jul. 26, 2011),9 pages.
"Non-Final Office Action", U.S. Appl. No. 12/414,434, (Jan. 17, 2012),7 pages.

(56) References Cited

OTHER PUBLICATIONS

"Non-Final Office Action", U.S. Appl. No. 12/414,434, (May 31, 2012),7 pages.
"Non-Final Office Action", U.S. Appl. No. 12/414,434, (Aug. 2, 2011),6 pages.
"Non-Final Office Action", U.S. Appl. No. 12/414,455, (Aug. 29, 2011),8 pages.
"Non-Final Office Action", U.S. Appl. No. 12/414,458, (Jul. 6, 2011),8 pages.
"Non-Final Office Action", U.S. Appl. No. 12/414,476, (Nov. 9, 2012),22 pages.
"Non-Final Office Action", U.S. Appl. No. 12/414,476, (Aug. 3, 2011),21 pages.
"Non-Final Office Action", U.S. Appl. No. 12/433,605, (Jun. 24, 2011),10 pages.
"Non-Final Office Action", U.S. Appl. No. 12/433,667, (Jun. 7, 2011),15 pages.
"Non-Final Office Action", U.S. Appl. No. 12/433,667, (Feb. 3, 2012),16 pages.
"Non-Final Office Action", U.S. Appl. No. 12/469,419, (Nov. 9, 2011),15 pages.
"Non-Final Office Action", U.S. Appl. No. 12/469,419, (May 23, 2012),13 pages.
"Non-Final Office Action", U.S. Appl. No. 12/469,458, (Jul. 1, 2011),15 pages.
"Non-Final Office Action", U.S. Appl. No. 12/469,458, (Sep. 21, 2012),14 pages.
"Non-Final Office Action", U.S. Appl. No. 12/469,480, (Oct. 17, 2012),16 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011),9 pages.
"Non-Final Office Action", U.S. Appl. No. 12/480,969, (Aug. 7, 2012),15 pages.
"Non-Final Office Action", U.S. Appl. No. 12/484,799, (Aug. 11, 2011),12 pages.
"Non-Final Office Action", U.S. Appl. No. 12/484,799, (Aug. 7, 2012),13 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Non-Final Office Action", U.S. Appl. No. 12/983,106, (Nov. 9, 2012),17 pages.
"Non-Final Office Action", U.S. Appl. No. 13/492,495, (Sep. 17, 2012),8 pages.
"Notice of Allowance", U.S. Appl. No. 11/215,052, (Mar. 14, 2012),5 pages.
"Notice of Allowance", U.S. Appl. No. 12/414,382, (Apr. 4, 2012),4 pages.
"Notice of Allowance", U.S. Appl. No. 12/414,434, (Aug. 17, 2012),4 pages.
"Notice of Allowance", U.S. Appl. No. 12/414,455, (Jan. 4, 2012),4 pages.
"Notice of Allowance", U.S. Appl. No. 12/414,458, (Oct. 31, 2011),2 pages.
"Notice of Allowance", U.S. Appl. No. 12/414,458, (Nov. 29, 2011),2 pages.
"Notice of Allowance", U.S. Appl. No. 12/414,458, (Aug. 10, 2011),6 pages.
"Notice of Allowance", U.S. Appl. No. 12/470,558, (Apr. 2, 2012),7 pages.
"Notice of Allowance", U.S. Appl. No. 12/470,558, (Aug. 23, 2012),2 pages.
"Notice of Allowance", U.S. Appl. No. 12/484,799, (Oct. 22, 2012),10 pages.
"Notice of Allowance", U.S. Appl. No. 12/484,845, (Mar. 16, 2012),5 pages.

"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999),8 pages.
"Oracle8i Application Developer's Guide—Advanced Queuing", Retrieved from: http://www.cs.umbc.edu/help/oracle8/server.815/a68005/03_adq1i.htm on May 6, 2009., (Feb. 1999),29 Pages.
"Oracle8i Concepts Release 8.1.5", Retrieved from: http://www.cs.umbc.edu/help/oracle8/server.815/a67781/c16queue.htm on May 6, 2009., (Feb. 1999),10 Pages.
"Palette Extender 1.0.2", Retrieved from: <http://palette-extender.en.softonic.com/symbian> on Nov. 6, 2008, (Jan. 21, 2003),2 pages.
"Parallax Scrolling", Retrieved from: <http://en.wikipedia.org/wiki/Parallax_scrolling> on May 5, 2009., (May 4, 2009),3 Pages.
"PCT Search Report and Written Opinion", Application No. PCT/US2009/061382, (May 26,2010), 10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
"PCT Search Report and Written Opinion", Application No. PCT/US2010/034772, (Dec. 29, 2010),12 pages.
"PCT Search Report and Written Opinion", Application No. PCT/US2011/055523, (May 10, 2012),9 pages.
"PCT Search Report and Written Opinion", Application No. PCT/US2011/055513, (Mar. 27, 2012),8 pages.
"PCT Search Report and Written Opinion", Application No. PCT/US2011/055512, (May 24, 2012),8 pages.
"PCT Search Report and Written Opinion", Application No. PCT/US2011/055524, (Jun. 1, 2012),8 pages.
"PCT Search Report and Written Opinion", Application No. PCT/US2011/065702, (Aug. 29, 2012),8 pages
"PCT Search Report and Written Opinion", Application No. PCT/US2011/055712, (Sep. 21, 2012),9 pages.
"PCT Search Report and Written Opinion", Application No. PCT/US2011/055736, (Sep. 17, 2012),8 pages.
"PCT Search Report and Written Opinion", Application No. PCT/US2011/055496, (Sep. 12, 2012),9 pages.
"PCT Search Report and Written Opinion", Application No. PCT/US2011/067073, (Sep. 17, 2012),8 pages.
"PCT Search Report and Written Opinion", Application No. PCT/US2011/055746, (Sep. 27, 2012),9 pages.
"PCT Search Report and Written Opinion", Application No. PCT/US2011/055725, Sep. 27, 2012),10 pages.
"PCT Search Report and Written Opinion", Application No. PCT/US2011/055478, (Sep. 27, 2012),9 pages.
"PCT Search Report and Written Opinion", Application No. PCT/US2011/055493, (Sep. 26, 2012),9 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.
"SecureMe—Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008),3 pages.
"Snap", *Windows 7 Features*, retrieved from <http://windows.microsoft.com/en-US/windows7/products/features/snap> on Sep. 23, 2011,2 pages.
"Symbian Applications", Retrieved from: <http://symbianfullversion.blogspot.com/2008_12_01_archive.html> on May 5, 2009., (Jan. 2009),51 Pages.
"Top 3 Task Switchers for Android", *TechCredo*, retrieved from <http://www.techcredo.com/android/top-3-task-switchers-for-android> on May 11, 2011,(Mar. 9, 2011),5 pages.
"Top Android App: Swipepad", *Best Android Apps Review*, retrieved from <http://www.bestandroidappsreview.com/2011/01/top-android-app-swipepad-launcher.html> on May 11, 2011,4 pages.

(56) References Cited

OTHER PUBLICATIONS

"Touch Shell Free", Retrieved from: <http://www.pocketpcfreeware.mobi/download-touch-shell-free.html> on May 5, 2009., (Feb. 23, 2009),2 Pages.

"Windows Phone 7 (Push Notification)", retrieved from <http://unknownerror.net/2011-06/windows-phone-7-push-notification-36520> on Jul. 6, 2011,4 pages.

"Winterface Review", Retrieved from: <http://www.mytodayscreen.com/winterface-review/> on Nov. 12, 2008, (Jul. 9, 2008), 42 pages.

"Womma", Retrieved from: <http://www.womma.org/blog/links/wom-trends/> on May 5, 2009., (2007),70 Pages.

"Working with Multiple Windows", *MSOFFICE tutorial!*, retrieved from <http://www.msoffice-tutorial.com/working-with-multiple-windows.php> on Sep. 23, 2011,3 pages.

Beiber, Gerald et al., "Screen Coverage: A Pen-Interaction Problem for PDA's and Touch Screen Computers", In Proceedings of ICWMC 2007,(Mar. 2007),6 pages.

Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011),5 pages.

Dolcourt, Jessica "Webware", Retrieved from: <http://news.cnet.com/webware/?categoryId=2010> May 5, 2009., 13 Pages.

Gade, Lisa "Samsung Alias u740", Retrieved from: <http://www.mobiletechreview.com/phones/Samsung-U740.htm> on Nov. 20, 2008, (Mar. 14, 2007),6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui 07132.pdf.> on Jul. 17, 2008, (Feb. 2007),pp. 1-42.

HA, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008.

Harrison, Richard "Symbian OS C++ for Mobile Phones vol. 3", Retrieved from: <http:// www.amazon.co.uk/Symbian-OS-Mobile-Phones-Press/dp/productdescription/0470066415> on Oct. 23, 2008, Symbian Press,(Jun. 16, 2003),4 pages.

Hickey, Andrew R., "Google Android has Landed; T-Mobile, HTC Unveil G1", Retrieved from: <http://www.crn.com/retail/210603348> on Nov. 26, 2008., (Sep. 23, 2008),4 pages.

Kcholi, Avi "Windows CE .NETInterprocess Communication", Retrieved from http://msdn.microsoft.com/en-us/library/ms836784.aspx on Jul. 17, 2008., (Jan. 2004),15 Pages.

LA, Nick "Parallax Gallery", Available at <http://webdesignerwall.comtutorials/parallax-gallery/comment-page-1>,(Apr. 25, 2008),16 pages.

Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>,(Sep. 2005),pp. 1717-1731.

Mantia, Louie "Multitasking: What Does It Mean?", retrieved from <http://mantia.me/blog/multitasking/> on Sep. 23, 2011,3 pages.

Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000),5 Pages.

Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to-switch-applications/> on May 11, 2011,(Nov. 13, 2010),4 pages.

Mei, Tao et al., "Probabilistic Multimodality Fusion for Event Based Home Photo Clustering", Retrieved from: <http://ieeexplore.ieee.org//stamp/stamp.jsp?tp=84arnumber=04036960.>, (Dec. 26, 2006),pp. 1757-1760.

Nordgren, Peder "Development of a Touch Screen Interface for Scania Interactor", *Masters Thesis in Computing Science*, UMEA University, Available at <http://www.cs.umu.se/education/examina/Rapporter/PederNordgren.pdf>,(Apr. 10, 2007),pp. 1-59.

Oliver, Sam "Potential iPhone Usability and Interface Improvements", Retrieved from: <http://www.appleinsider.com/articles/08/09/18/potential_iphone_usability_and_interface_improvements.html> on Nov. 12, 2008, AppleInsider,(Sep. 18, 2008),4 pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004),10 Pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008),1 page.

Remond, Mickael "Mobile Marketing Solutions", Retrieved from: <http://www.mobilemarketingmagazine.co.uk/mobile_social_networking/> on May 5, 2009., (Apr. 28, 2009),16 Pages.

Rice, Stephen V., et al., "A System for Searching Sound Palettes", *Proceedings of the Eleventh Biennial Symposium on Arts and Technology*, Available at <http://www.comparisonics.com/FindSoundsPalettePaper.pdf>,(Feb. 2008),6 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002),83 Pages.

Steinicke, Frank et al., "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf>,(Jun. 15, 2008).4 Pages Suror, "PocketShield—New Screenlock App for the HTC Diamond and Pro", Retrieved from <http://wmpoweruser.com/?tag=htc-touch-diamond> on Jun. 28, 2011, (Oct. 23, 2008),2 pages.

Terpstra, Brett "Beta Beat: Grape, a New Way to Manage Your Desktop Clutter", Retrieved from: Beta Beat: Grape, a New Way to Manage Your Desktop Clutter on Jun. 28, 2011 (Apr. 14, 2009),4 pages.

Vallerio, Keith S., et al., "Energy-Efficient Graphical User Interface Design", Retrieved from: <http://www.cc.qatech.edu/classes/AY2007/cs7470_fall/zhong-energy-efficient-user-interface.pdf>, (Jun. 10, 2004),pp. 1-13.

Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011),4 pages.

Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011),6 pages.

Wilson, Tracy V., "How the iPhone Works", Retrieved from: <http://electronics.howstuffworks.com/iphone2.htm> on Apr. 24, 2009, (Jan. 2007),9 pages.

Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009),10 pages.

Wyatt, Paul "/Flash/the art of parallax scrolling", .net Magazine,(Aug. 1, 2007),pp. 74-76.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.

"Enhanced IBM Power Systems software and PowerVM restructuring", Retrieved at <<http://www.ibm.com/common/ssi/rep_ca/2/897/ENUS208-082/ENUS208082.PDF>>, Apr. 8, 2008, pp. 1-19.

(56) References Cited

OTHER PUBLICATIONS

"OmneMon™ System Resource Metrics", Retrieved at <<http://www.omnesys.com/documents/OmneMonSRM_Brochure.pdf>>, Retrieved Date: Jun. 10, 2011, pp. 3.

"New Features in WhatsUp Gold v12.0", Retrieved at <<http://www.netbright.co.th/?name=product&file=readproduct&id=12>>, Retrieved Date: Jun. 10, 2011, pp. 4.

"Application User Model IDs", Retrieved from: <http://msdn.microsoft.com/en-us/library/dd378459(VS.85).aspx> on Sep. 28, 2010, (2010),6 pages.

"Class ScrollView", Retrieved from: <http://www.blackberry.com/developers/docs/6.0.0api/net/rim/device/api/ui/ScrollView.html> on Sep. 28, 2010, 13 pages.

"Email Notification for Microsoft Outlook and Outlook Express", Retrieved from: <http://www.contextmagic.com/express-notification/> on Sep. 29, 2010, (Jul. 21, 2004),3 pages "eXtreme Energy Conservation: Advanced Power-Saving Software for Wireless Devices", *White Paper, Freescale Semiconductor, Inc.*, Document No. XTMENRGYCNSVWP, Rev #0 ), available at <http://www.freescale.com/files/32bit/doc/white_paper/XTMENRGYCNSVWP.pdf>,(Feb. 2006),15 pages.

"Final Office Action", U.S. Appl. No. 11/305,789, (Apr. 1, 2009),10 pages.

"Final Office Action", U.S. Appl. No. 11/502,264, (Feb. 4, 2010),15 pages.

"Final Office Action", U.S. Appl. No. 11/502,264, (Apr. 3, 2009),9 pages.

"GnomeCanvas", Retrieved from: <http://library.gnome.org/devel/libgnomecanvas/unstable/GnomeCanvas.html> on Sep. 28, 2010, 11 pages.

"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010),1 page.

"How do I use Categories with my Weblog?", Retrieved from: <http://tpsupport.mtcs.sixapart.com/tp/us-tp1/how_do_i_use_categories_with_my_weblog.html> on Sep. 28, 2010, (Sep. 16, 2009),3 pages.

"iPad User Guide", retrieved from <http://cyndidannerkuhn.info/CDK/iPads_Resources_files/iPad_User_Guide.pdf> on Jun. 17, 2011,154 pages.

"Magic mouse", Retrieved from: <http://www.apple.com/magicmouse/> on May 10, 2011,3 pages.

"moGo beta v.0.4", Retrieved from: <http://forum.xda-developers.com/showthread.php?t=375196> on Sep. 27, 2010. (Mar. 7, 2008),10 pages.

"Non-Final Office Action", U.S. Appl. No. 11/305,789, (Sep. 21, 2009),5 pages.

"Non-Final Office Action", U.S. Appl. No. 11/502,264, (Sep. 30, 2009),15 pages.

"Notice of Allowance", U.S. Appl. No. 11/305,789, (Nov. 23, 2009),8 pages.

"Notifications", retrieved from <http://msdn.microsoft.com/en-us/library/aa511497.aspx> on May 10, 2011,16 pages.

"Onyx Graphics Announces New ONYX Prepedge Job Preparation Software", retrieved from <http://www.largeformatreview.com/rip-software/433-onyx-graphics-announces-new-onyx-> on May 10, 2011,2 pages.

"Push Notifications Overview for Windows Phone", Retrieved from: <http://msdn.microsoft.com/en-us/library/ff402558%28VS.92%29.aspx> on Sep. 30, 2010 (Sep. 3, 2010),1 page.

"The Map Screen", retrieved from <http://www.symbianos.org/whereamiusersguide> on Jun. 17, 2011,3 pages.

"User Guide", retrieved from <http://wireframesketcher.com/help/help.html> on Jun. 17, 2011,19 pages.

"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.

"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010),3 pages.

"Yui 3: ScrollView [beta]", Retrieved from: <http://developer.yahoo.com/yui/3/scrollview/> on Sep. 28, 2010, 5 pages.

Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996),8 pages.

Bjork, Staffan et al., "Redefining the Focus and Context of Focus+Context Visualizations", *In Proceedings of INFOVIS 2000*, Available at <http://www.johan.redstrom.se/papers/redefining.pdf>,(Oct. 2000),9 pages.

Bowes, James et al., "Transparency for Item Highlighting", *Faculty of Computing Science*, Dalhousie University, Available at <http://torch.cs.dal.ca/~dearman/pubs/GI2003-bowes,dearman,perkins-paper.pdf>,(2003),2 pages.

Buring, Thorsten "User Interaction with Scatterplots on Small Screens—A Comparative Evaluation of Geometric-Semantic Zoom and Fisheye Distortion", *IEEE Transactions on Visualization and Computer Graphics*, vol. 12, Issue 5, Available at <http://citeseerx.ist.psu.edu/viewdoc/download?doi=10.1.1.134.4568&rep=rep1&type=pdf>,(Sep. 2006),pp. 829-836.

Carrera, Enrique V., et al., "Conserving Disk Energy in Network Servers", available at <http://citeseerx.ist.psu.edu/viewdoc/download?doi=10.1.1.6.8301&rep=rep1&type=ps>,(Nov. 2002),15 pages.

Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.

Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.

Cohen, Michael F., et al., "Wang Tiles for Image and Texture Generation", *In Proceedings of SIGGRAPH 2003*, Available <http://research.microsoft.com/en-us/um/people/cohen/WangFinal.pdf>,(2003),8 pages.

Davis, Ashley "A WPF Custom Control for Zooming and Panning", Retrieved from: <http://www.codeproject.com/KB/WPF/zoomandpancontrol.aspx> on Sep. 28, 2010 (Jun. 29, 2010),21 pages.

Delimarsky, Den "Sending Tile Push Notifications on Windows Phone 7", retrieved from <http://mobile.dzone.com/articles/sending-tile-push> on May 10, 2011,(Aug. 25, 2010),2 pages.

Denoue, Laurent et al., "WebNC: Efficient Sharing of Web Applications", *In Proceedings of WWWW 2009*, Available at <http://www.fxpal.com/publications/FXPAL-PR-09-495.pdf>,(2009),2 pages.

Dunsmuir, Dustin "Selective Semantic Zoom of a Document Collection", Available at <http://www.cs.ubc.ca/~tmm/courses/533/projects/dustin/proposal.pdf>,(Oct. 30, 2009),pp. 1-9.

Fisher, Bill "Cool Discussion of Push Notifications—Toast and Tile—on Windows Phone", Retrieved from: <http://www.windowsphoneexpert.com/Connection/forums/p/4153/18399.aspx>on Sep. 29, 2010 (May 3, 2010),3 pages.

Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>,(Feb. 15, 2005),pp. 1-15.

Long, Todd "Gmail Manager 0.6", Retrieved from: <https://addons.mozilla.org/en-US/firefox/addon/1320/> on Sep. 29, 2010, (Jan. 27, 2010),4 pages.

Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010),3 pages.

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.

Ritchie, Rene "iOS 4 features: iPod touch Wi-Fi stays connected when asleep—iPhone too?", Retrieved from: <http://www.goip.

(56) References Cited

OTHER PUBLICATIONS com/2010/06/ios-4-features-ipod-touch-wi-fi-stays-connected-when-asleep-%E2%80%94-iphone-too/> on Sep. 30, 2010, (Jun. 14, 2010),2 pages.

Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009),7 pages.

Sandoval, Guillermo L., "A development platform and execution environment for mobile applications", Universidad Autónoma de Baja California, School of Chemical Sciences and Engineering, Available at <http://citeseerx.ist.psu.edu/viewdoc/download-?doi=10.1.1.86.7989&rep=rep1&type=pdf>,(2004),18 pages.

Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003),pp. 1-10.

Vornberger, Jan "Bluetile", Retrieved from: <http://www.bluetile.org> on Sep. 29, 2010, 5 pages.

Wilson, Andrew D., "Robust Computer Vision-Based Detection of Pinching for One and Two-Handed Gesture Input", *In Proceedings of UIST 2006*, Available at <http://research.microsoft.com/en-us/um/people/awilson/publications/wilsonuist2006/uist%202006%20taffi.pdf>,(Oct. 2006),4 pages.

Wu, Chung et al., "Achieving a Superior Ownership Experience in Manageability and Quality for Siebel CRM", available at <http://www.oracle.com/us/products/enterprise-manager/superior-exp-for-siebel-crm-068962.pdf>,(Aug. 2008),25 pages.

"PCT Search Report and Written Opinion", Application No. PCT/US2011/055521, (May 15, 2012), 9 pages.

"PCT Search Report and Written Opinion", Application No. PCT/US2011/055522, (May 15, 2012), 9 pages.

"PCT Search Report and Written Opinion", Application No. PCT/US2011/055511, (Apr. 24, 2012), 9 pages.

"PCT Search Report and Written Opinion", Application No. PCT/US2011/055520, (May 9, 2012), 8 pages.

"Non-Final Office Action", U.S. Appl. No. 12/972,967, (Jan. 30, 2013),19 pages.

"Non-Final Office Action", U.S. Appl. No. 12/977,584, (Dec. 7, 2012), 8 pages.

"Non-Final Office Action", U.S. Appl. No. 12/978,184, (Jan. 23, 2013), 7 pages.

"Non-Final Office Action", U.S. Appl. No. 13/196,272, (Feb. 6, 2013),10 pages.

"Non-Final Office Action", U.S. Appl. No. 13/224,258, (Jan. 8, 2013), 35 pages.

"Non-Final Office Action", U.S. Appl. No. 13/492,495, (Dec. 19, 2012), 6 pages.

"Non-Final Office Action", U.S. Appl. No. 13/655,386, (Dec. 26, 2012), 23 pages.

"Non-Final Office Action", U.S. Appl. No. 13/656,354, (Feb. 6, 2013),10 pages.

"Non-Final Office Action", U.S. Appl. No. 13/656,574, (Jan. 31, 2013), 21 pages.

"Non-Final Office Action", U.S. Appl. No. 13/657,621, (Feb. 7, 2013),19 pages.

"Non-Final Office Action", U.S. Appl. No. 13/657,646, (Jan. 3, 2013),13 pages.

"Non-Final Office Action", U.S. Appl. No. 13/657,789, (Jan. 9, 2013), 38 pages.

"PCT Search Report and Written Opinion", Application No. PCT/US2011/067075, (Dec. 12, 2012),10 pages.

Livingston, et al., "Windows 95 Secrets", *1995 I DG Books Worldwide, 3rd Edition*, (1995), pp. 121-127.

Perry, Greg "Teach Yourself Windows 95 in 24 Hours", 1997, *Sams Publishing, 2nd Edition*, (1997), pp. 193-198.

"Final Office Action", U.S. Appl. No. 11/502,264, (Mar. 29, 2013),16 pages.

"Final Office Action", U.S. Appl. No. 13/655,386, (Jun. 6, 2013), 34 pages.

"Final Office Action", U.S. Appl. No. 13/657,646, (May 6, 2013),12 pages.

"Non-Final Office Action", U.S. Appl. No. 13/118,204, (Feb. 28, 2013),13 pages.

"Non-Final Office Action", U.S. Appl. No. 13/118,257, (Mar. 5, 2013),19 pages.

"Non-Final Office Action", U.S. Appl. No. 13/118,321, (Jun. 10, 2013), 32 pages.

"Non-Final Office Action", U.S. Appl. No. 13/118,339, (Feb. 11, 2013),15 pages.

"Non-Final Office Action", U.S. Appl. No. 13/118,347, (Feb. 12, 2013),14 pages.

"Notice of Allowance", U.S. Appl. No. 13/492,495, (Apr. 26, 2013), 5 pages.

"Notice of Allowance", U.S. Appl. No. 13/655,390, (May 24, 2013), 5 pages.

"PCT Search Report and Written Opinion", Application No. PCT/US2012/047091, (Dec. 27, 2012),15 pages.

"Final Office Action", U.S. Appl. No. 12/721,422, (Mar. 7, 2013),10 pages.

"Final Office Action", U.S. Appl. No. 13/118,339, (Aug. 22, 2013), 21 pages.

"Final Office Action", U.S. Appl. No. 13/118,347, (Aug. 15, 2013), 25 pages.

"Final Office Action", U.S. Appl. No. 13/656,354, (Jun. 17, 2013),14 pages.

"Final Office Action", U.S. Appl. No. 13/656,574, (Aug. 23, 2013), 20 pages.

"Final Office Action", U.S. Appl. No. 13/657,789, (Jun. 21, 2013), 35 pages.

"Non-Final Office Action", U.S. Appl. No. 12/721,422, (Oct. 1, 2012), 7 pages.

"Non-Final Office Action", U.S. Appl. No. 13/073,300, (Jul. 25, 2013),13 pages.

"Non-Final Office Action", U.S. Appl. No. 13/118,333, (Jul. 5, 2013),18 pages.

"Notice of Allowance", U.S. Appl. No. 12/721,422, (Jul. 11, 2013), 9 pages.

"Notice of Allowance", U.S. Appl. No. 12/977,584, (Jun. 19, 2013), 5 pages.

"Notice of Allowance", U.S. Appl. No. 12/978,184, (Aug. 2, 2013), 5 pages.

"Supplemental Notice of Allowance", U.S. Appl. No. 13/655,390, (Jul. 25, 2013), 2 pages.

"You've Got Mail 1.4 Build", retrieved from <http://www.fileshome.com/Shows_Animation_Plays_Sound_Automatic_N . . . > on Jan. 6, 2010, (Jun. 18, 2007), 2 pages.

Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, (Oct. 21, 2008), 2 pages.

Keranen, Jaakko "OpenGL-based User Interface Toolkit for Symbian Mobile Devices", Master of Science Thesis, Tamere University of Technology, Department of Information Technology, (Apr. 6, 2005), 88 pages.

Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.

Kurdi, Samer "WinSplit Revolution", Retrieved from <http://www.freewaregenius.com/winsplit-revolution/> on Jun. 30, 2013, (Aug. 22, 2007), 4 Pages.

"Final Office Action", U.S. Appl. No. 13/118,321, Dec. 19, 2013, 30 pages.

"Non-Final Office Action", U.S. Appl. No. 13/655,390, Dec. 17, 2012, 12 pages.

"Foreign Office Action", CN Application No. 201110437572.2, Dec. 3, 2013, 7 pages.

"Foreign Office Action", CN Application No. 201110454251.3, Dec. 27, 2013, 12 Pages.

(56) References Cited

OTHER PUBLICATIONS

"Non-Final Office Action", U.S. Appl. No. 13/228,888, Feb. 10, 2014, 21 pages.
"Restriction Requirement", U.S. Appl. No. 13/118,265, Feb. 27, 2014, 7 pages.
"Supplemental Notice of Allowance", U.S. Appl. No. 12/978,184, Feb. 25, 2014, 2 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Non-Final Office Action", U.S. Appl. No. 13/229,556, Mar. 28, 2014, 12 pages.
"Final Office Action", U.S. Appl. No. 13/073,300, Apr. 1, 2014, 14 pages.
"Restriction Requirement", U.S. Appl. No. 13/118,288, Mar. 4, 2014, 7 pages.
"Final Office Action", U.S. Appl. No. 12/972,967, (Oct. 11, 2013), 21 pages.
"Final Office Action", U.S. Appl. No. 12/983,106, (Oct. 7, 2013), 19 pages.
"Final Office Action", U.S. Appl. No. 13/118,204, (Nov. 21, 2013), 24 pages.
"Final Office Action", U.S. Appl. No. 13/224,258, (Sep. 11, 2013), 37 pages.
"Final Office Action", U.S. Appl. No. 13/657,621, (Sep. 10, 2013), 18 pages.
"Non-Final Office Action", U.S. Appl. No. 13/228,707, (Oct. 25, 2013), 12 pages.
"Non-Final Office Action", U.S. Appl. No. 13/196,272, (Sep. 3, 2013), 5 pages.
"Non-Final Office Action", U.S. Appl. No. 13/228,876, (Nov. 22, 2013), 14 pages.
"Non-Final Office Action", U.S. Appl. No. 13/229,155, (Nov. 18, 2013), 14 pages.
"Notice of Allowance", U.S. Appl. No. 12/978,184, (Nov. 6, 2013), 5 pages.
"Notice of Allowance", U.S. Appl. No. 13/196,272, (Nov. 8, 2013), 8 pages.
"Supplemental Notice of Allowance", U.S. Appl. No. 12/977,584, (Sep. 16, 2013), 2 pages.
"Supplemental Notice of Allowance", U.S. Appl. No. 12/977,584, (Oct. 11, 2013), 2 pages.
"Supplemental Notice of Allowance", U.S. Appl. No. 13/655,390, (Sep. 19, 2013), 2 pages.
"Foreign Office Action", CN Application No. 201210331686.3, Jun. 13, 2014, 13 pages.
"Notice of Allowance", U.S. Appl. No. 13/656,574, Sep. 23, 2014, 7 pages.
"Extended European Search Report", EP Application No. 11866579.3, Oct. 9, 2014, 7 pages.
"Final Office Action", U.S. Appl. No. 13/118,265, Nov. 6, 2014, 19 pages.
"Final Office Action", U.S. Appl. No. 13/118,288, Nov. 7, 2014, 14 pages.
"Final Office Action", U.S. Appl. No. 13/118,292, Dec. 5, 2014, 30 pages.
"Final Office Action", U.S. Appl. No. 13/228,888, Oct. 24, 2014, 29 pages.
"Final Office Action", U.S. Appl. No. 13/228,945, Oct. 23, 2014, 24 pages.
"Foreign Notice of Acceptance", NZ Application No. 618269, Oct. 31, 2014, 1 Page.
"Foreign Office Action", CN Application No. 201110454251.3, Oct. 21, 2014, 13 Pages.
"Foreign Office Action", CN Application No. 201180071196.8, Sep. 11, 2014, 13 pages.
"Non-Final Office Action", U.S. Appl. No. 12/972,967, Nov. 6, 2014, 17 pages.
"Non-Final Office Action", U.S. Appl. No. 13/118,321, Nov. 12, 2014, 33 pages.
"Non-Final Office Action", U.S. Appl. No. 13/118,347, Dec. 3, 2014, 28 pages.
"Non-Final Office Action", U.S. Appl. No. 13/228,707, Nov. 13, 2014, 20 pages.
"Non-Final Office Action", U.S. Appl. No. 14/089,149, Nov. 3, 2014, 8 pages.
"Non-Final Office Action", U.S. Appl. No. 14/109,779, Nov. 21, 2014, 9 pages.
"Notice of Allowance", U.S. Appl. No. 14/089,149, Dec. 5, 2014, 4 pages.
"Supplemental Notice of Allowance", U.S. Appl. No. 13/118,204, Oct. 2, 2014, 2 pages.
"Supplemental Notice of Allowance", U.S. Appl. No. 13/118,204, Oct. 23, 2014, 3 pages.
Webmonkey "HTML Cheatsheet", Retrieved From: <http://www.webmonkey.com/2010/02/html_cheatsheet> on Nov. 7, 2014, Feb. 15, 2010, 5 pages.
"Corrected Notice of Allowance", U.S. Appl. No. 13/656,574, Dec. 12, 2014, 4 pages.
"Extended European Search Report", EP Application No. 11866553.8, Dec. 9, 2014, 7 pages.
"Extended European Search Report", EP Application No. 11867033.0, Nov. 27, 2014, 8 pages.
"Final Office Action", U.S. Appl. No. 13/228,931, Dec. 19, 2014, 27 pages.
"Foreign Office Action", CO Application No. 13300256, Sep. 24, 2014, 8 Pages.
"Foreign Office Action", CO Application No. 13300265, Sep. 24, 2014, 10 Pages.
"Non-Final Office Action", U.S. Appl. No. 13/118,339, Dec. 10, 2014, 16 pages.
"Final Office Action", U.S. Appl. No. 13/118,333, Apr. 23, 2014, 22 pages.
"Final Office Action", U.S. Appl. No. 13/224,258, Jul. 18, 2014, 39 pages.
"Final Office Action", U.S. Appl. No. 13/228,707, May 21, 2014, 16 pages.
"Final Office Action", U.S. Appl. No. 13/228,876, Jul. 18, 2014, 15 pages.
"Final Office Action", U.S. Appl. 13/229,155, Jun. 12, 2014, 15 pages.
"Final Office Action", U.S. Appl. No. 13/345,383, Jul. 25, 2014, 26 pages.
"First Examination Report", NZ Application No. 618269, May 20, 2014, 2 pages.
"First Examination Report", NZ Application No. 618284, May 20, 2014, 2 pages.
"Foreign Office Action", CN Application No. 201110429183.5, Aug. 21, 2014, 13 Pages.
"Foreign Office Action", CN Application No. 201180071186.4, Jun. 13, 2014, 12 pages.
"Foreign Office Action", CN Application No. 201210317470.1, Jun. 5, 2014, 12 pages.
"Gestures Programming", Retrieved from <http://doc.qt.digia.com/4.6/gestures-overview.html> on May 28, 2014, 2010, 3 pages.
"Image Gestures Example", Retrieved from <http://doc.qt.digia.com/4.6/gestures-imagegestures.html> on May 28, 2014, 2010, 3 pages.
"Non-Final Office Action", U.S. Appl. No. 12/983,106, Sep. 10, 2014, 19 pages.
"Non-Final Office Action", U.S. Appl. No. 13/118,265, Jun. 10, 2014, 13 pages.
"Non-Final Office Action", U.S. Appl. No. 13/118,288, Jul. 2, 2014, 17 pages.
"Non-Final Office Action", U.S. Appl. No. 13/118,292, Jun. 6, 2014, 25 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.

(56) References Cited

OTHER PUBLICATIONS

"Non-Final Office Action", U.S. Appl. No. 13/229,702, Jul. 3, 2014, 28 pages.
"Non-Final Office Action", U.S. Appl. No. 13/229,709, Apr. 7, 2014, 12 pages.
"Non-Final Office Action", U.S. Appl. No. 13/657,621, Jul. 18, 2014, 22 pages.
"Non-Final Office Action", U.S. Appl. No. 13/657,646, Aug. 12, 2014, 14 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 13/118,204, Jul. 8, 2014, 8 pages.
"Notice of Allowance", U.S. Appl. No. 13/229,556, Sep. 2, 2014, 12 pages.
"Notice of Allowance", U.S. Appl. No. 13/229,709, Sep. 2, 2014, 4 pages.
"Notice of Allowance", U.S. Appl. No. 13/655,386, Apr. 25, 2014, 6 pages.
"Notice of Allowance", U.S. Appl. No. 13/657,789, Aug. 4, 2014, 16 pages.
"QPinchGesture Class Reference", Retrieved from <http://doc.qt.digia.com/4.6/qpinchgesture.html> on May 28, 2014, 2010, 6 pages.
"Supplemental Notice of Allowance", U.S. Appl. No. 13/118,204, Sep. 10, 2014, 2 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
Camick, "Wrap Layout", Java Tips Weblog, retrieved from <https://tips4java.wordpress.com/2008/11/06/wrap-layout/> on Jan. 11, 2015, Nov. 6, 2008, 28 pages.
"Foreign Notice of Allowance", CN Application No. 201110437572.2, Mar. 3, 2015, 3 Pages.
"Foreign Office Action", CN Application No. 201110437542.1, Jan. 28, 2015, 7 pages.
"Foreign Office Action", CN Application No. 201110437542.1, Aug. 20, 2014, 8 pages.
"Foreign Office Action", CN Application No. 201110454251.3, Feb. 28, 2015, 9 Pages.
"Non-Final Office Action", U.S. Appl. No. 13/345,383, Jan. 29, 2015, 5 pages.
"Notice of Allowance", U.S. Appl. No. 13/118,339, Mar. 31, 2015, 7 pages.
"Supplemental Notice of Allowance", U.S. Appl. No. 14/089,149, Mar. 20, 2015, 2 pages.
"Foreign Office Action", CN Application No. 201210331188.9, Oct. 10, 2014, 12 pages.
"Foreign Office Action", CN Application No. 201210331584.1, Nov. 3, 2014, 14 pages.
"Foreign Office Action", CN Application No. 201210331158.8, Sep. 3, 2014, 16 Pages.
"Extended European Search Report", EP Application No. 11872137.2, Apr. 9, 2015, 12 pages.
"Final Office Action", U.S. Appl. No. 13/118,321, Apr. 2, 2015, 30 pages.
"Foreign Notice of Allowance", CN Application No. 201110429183.5, Mar. 9, 2015, 4 Pages.
"Foreign Office Action", CN Application No. 201210317470.1, Feb. 11, 2015, 9 pages.
"Foreign Office Action", CN Application No. 201210331670.2, Mar. 25, 2015, 14 pages.
"Foreign Office Action", CN Application No. 201210331686.3, Mar. 3, 2015, 14 pages.
"Foreign Office Action", PH Application No. PH/1/2013/502367, Apr. 24, 2015, 3 pages.
"Non-Final Office Action", U.S. Appl. No. 13/073,300, Apr. 30, 2015, 15 pages.
"Non-Final Office Action", U.S. Appl. No. 13/550,432, Apr. 27, 2015, 15 pages.
"Notice of Allowance", U.S. Appl. No. 13/118,333, May 4, 2015, 16 pages.
"Notice of Allowance", U.S. Appl. No. 13/118,347, Apr. 1, 2015, 7 pages.
"Notice of Allowance", U.S. Appl. No. 13/229,702, Apr. 29, 2015, 7 pages.
"Rename a file", Retrieved from <http://windows.microsoft.com/en-us/windows7/rename-a-file> on Apr. 27, 2015, Aug. 24, 2009, 1 page.
"Corrected Notice of Allowance", U.S. Appl. No. 13/118,333, Jun. 1, 2015, 4 pages.
"Extended European Search Report", EP Application No. 11871863.4, May 11, 2015, 8 pages.
"Extended European Search Report", EP Application No. 11871917.8, May 11, 2015, 9 pages.
"Final Office Action", U.S. Appl. No. 13/228,707, Jun. 1, 2015, 20 pages.
"Final Office Action", U.S. Appl. No. 13/228,876, Jun. 19, 2015, 20 pages.
"Final Office Action", U.S. Appl. No. 13/229,155, Jun. 4, 2015, 16 pages.
"Foreign Office Action", CL Application No. 3368-2013, May 7, 2015, 7 pages.
"Foreign Office Action", CL Application No. 3370-2013, May 7, 2015, 6 pages.
"Foreign Office Action", CN Application No. 201180071186.4, Jun. 2, 2015, 7 pages.
"Foreign Office Action", CN Application No. 201210331158.8, May 11, 2015, 7 pages.
"Foreign Office Action", CO Application No. 13300256, Apr. 11, 2015, 8 Pages.
"Notice of Allowance", U.S. Appl. No. 14/109,779, Jun. 17, 2015, 4 pages.
Bederson, "Implementing a Zooming User Interface: Experience Building Pad++", Software Practice & Experience, Wiley & Sons, Aug. 1998, 34 pages.
Bederson, "Jazz: An Extensible Zoomable User Interface Graphics Toolkit in Java", Proceedings of the 2000 ACM SIGCPR Conference, Apr. 2000, 11 pages.
Jetter, "Materializing the Query with Facet-Streams—A Hybrid Surface for Collaborative Search on Tabletops", May 7, 2011, 10 pages.
"Corrected Notice of Allowance", U.S. Appl. No. 13/118,333, Aug. 4, 2015, 4 pages.
"Corrected Notice of Allowance", U.S. Appl. No. 14/109,779, Jul. 21, 2015, 2 pages.
"Extended European Search Report", EP Application No. 11872072.1, Jul. 28, 2015, 7 pages.
"Final Office Action", U.S. Appl. No. 12/983,106, Jul. 16, 2015, 23 pages.
"Final Office Action", U.S. Appl. No. 13/073,300, Sep. 4, 2015, 17 pages.
"Final Office Action", U.S. Appl. No. 13/224,258, Aug. 13, 2015, 39 pages.
"Foreign Notice of Allowance", CN Application No. 201110437542.1, Aug. 3, 2015, 4 Pages.
"Further Examination Report", NZ Application No. 618284, Jul. 13, 2015, 2 pages.
"Non-Final Office Action", U.S. Appl. No. 13/118,265, Aug. 20, 2015, 18 pages.
"Non-Final Office Action", U.S. Appl. No. 13/118,288, Aug. 24, 2015, 19 pages.
"Non-Final Office Action", U.S. Appl. No. 13/118,321, Sep. 8, 2015, 34 pages.
"Non-Final Office Action", U.S. Appl. No. 14/059,163, Aug. 8, 2015, 5 pages.
"Non-Final Office Action", U.S. Appl. No. 14/659,442, Jul. 7, 2015, 7 pages.
"Notice of Allowance", U.S. Appl. No. 14/659,442, Aug. 19, 2015, 4 pages.

(56) References Cited

OTHER PUBLICATIONS

Gladisch,"MultiStates: Monitoring Databases With Acoustic and Intuitive Perspective Wall Interaction", In Proceedings of 2nd International Workshop on Design & Evaluation of e-Government Applications and Services, Aug. 24, 2009, 7 pages.
Johnson,"Create an Awesome Zooming Web Page With jQuery", Retrieved from <http://designshack.net/articles/javascript/create-an-awesome-zooming-web-page-withjquery/> on Aug. 20, 2015, May 25, 2011, 11 pages.
"Corrected Notice of Allowance", U.S. Appl. No. 13/656,574, Jan. 13, 2015, 4 pages.
"Corrected Notice of Allowance", U.S. Appl. No. 14/089,149, Feb. 20, 2015, 2 pages.
"Final Office Action", U.S. Appl. No. 13/229,702, Jan. 15, 2015, 24 pages.
"Final Office Action", U.S. Appl. No. 13/657,621, Jan. 15, 2015, 22 pages.
"Foreign Office Action", CN Application No. 201180071186.4, Jan. 20, 2015, 8 pages.
"Foreign Office Action", CN Application No. 201210331564.4, Dec. 3, 2014, 12 pages.
"Non-Final Office Action", U.S. Appl. No. 13/228,876, Jan. 29, 2015, 18 pages.
"Non-Final Office Action", U.S. Appl. No. 13/229,155, Jan. 7, 2015, 14 pages.
"Notice of Allowance", U.S. Appl. No. 13/657,646, Feb. 6, 2015, 15 pages.
"Supplemental Notice of Allowance", U.S. Appl. No. 13/656,574, Feb. 25, 2015, 4 pages.
"Wrap Layout", Java Tips Weblog, retrieved from <https://tips4java.wordpress.com/2008/11/06/wrap-layout/> on Jan. 11, 2015, Nov. 6, 2008, 28 pages.
"Corrected Notice of Allowance", U.S. Appl. No. 13/118,333, Sep. 14, 2015, 4 pages.
"Corrected Notice of Allowance", U.S. Appl. No. 14/109,779, Oct. 19, 2015, 2 pages.
"Corrected Notice of Allowance", U.S. Appl. No. 14/659,442, Nov. 10, 2015, 2 pages.
"Extended European Search Report", Application No. 11871739.6, Oct. 5, 2015, 13 pages.
"Final Office Action", U.S. Appl. No. 13/550,432, Sep. 14, 2015, 18 pages.
"Foreign Notice of Allowance", CN Application No. 201210331158.8, Sep. 8, 2015, 3 Pages.
"Foreign Office Action", CN Application No. 201110454251.3, Sep. 30, 2015, 10 Pages.
"Foreign Office Action", CN Application No. 201210317470.1, Aug. 24, 2015, 9 pages.
"Foreign Office Action", CN Application No. 201210331564.4, Sep. 2, 2015, 14 pages.
"Foreign Office Action", CN Application No. 201210331584.1, Aug. 19, 2015, 7 pages.
"Foreign Office Action", CN Application No. 201210331686.3, Sep. 1, 2015, 11 pages.
"Foreign Office Action", EP Application No. 11866579.3, Sep. 3, 2015, 4 pages.
"Foreign Office Action", JP Application No. 2014-512819, Sep. 29, 2015, 4 pages.
"Foreign Office Action", JP Application No. 2014-528371, Sep. 29, 2015, 16 pages.
"Foreign Office Action", JP Application No. 2014-529671, Sep. 29, 2015, 16 pages.
"Foreign Office Action", JP Application No. 2014-529672, Oct. 6, 2015, 7 pages.
"Foreign Office Action", RU Application No. 2014107906, Oct. 6, 2015, 6 pages.
"Foreign Office Action", RU Application No. 2014108874, Oct. 6, 2015, 6 pages.
"Introduction to Windows 7", https://www.google.com/url?q=http://www.wright.edu/sites/default/files/page/attachements/windows7.pdf, Jul. 1, 2010, 13 pages.
"Samsung Galaxy 2 TouchWiz 4.0 Tour (Homescreen, Settings, etc.)", https://www.youtube.com/watch?v=oXBbiy0Adiw, May 9, 2011, 3 pages.
"Search Report", TW Application No. 100136568, Sep. 14, 2015, 2 pages.
"Android Apps in Depth—02—Go Launcher EX", https://www.youtube.com/watch?v=u5LISE8BU_E, Mar. 6, 2011, 3 pages.
"Android HTC EVO 4G Tutorials 01—Getting Started, Home Screens", https://www.youtube.com/watch?v=fwvt-rsCMA8, Feb. 3, 2011, 3 pages.
Demers,"In Depth: Go Launcher EX—Droid Life", http://www.droid-life.com/2011/01/26/in-depth-go-launcher-ex/, Jan. 26, 2011, 8 pages.
Takahiro,"Let's Manage the Installed Applications", In Easy to Use Mini, Exhaustion Utilization of iPhone, vol. 1, p. 25 Memo, Mar. 10, 2011, 6 pages.
"Corrected Notice of Allowance", U.S. Appl. No. 14/659,442, Nov. 27, 2015, 2 pages.
"Extended European Search Report", EP Application No. 11872164.6, Sep. 18, 2015, 8 pages.
"Foreign Office Action", JP Application No. 2014-512824, Nov. 6, 2015, 5 pages.
"Foreign Office Action", JP Application No. 2014-529684, Nov. 4, 2015, 10 pages.
"Foreign Office Action", JP Application No. 2014-529685, Nov. 4, 2015, 5 pages.
"Foreign Office Action", JP Application No. 2014-529687, Oct. 20, 2015, 8 pages.
"Foreign Office Action", RU Application No. 2013152635, Oct. 28, 2015, 4 pages.
"Non-Final Office Action", U.S. Appl. No. 13/118,292, Dec. 7, 2015, 32 pages.
Sakumi,"Browse/Creation Tool for Hierarchy Contents with Concept Pad System: Zoomable User Interface(NEED DOC)", In Lecture Note/Software Science 23 Interactive System and Software VIII, Dec. 20, 1999, 8 pages.
Stein,"Growing Beautiful Code in BioPerl", In Beautiful Code—Leading Programmers Explain How They Think, Oreilly, 2007, 32 pages.

* cited by examiner

RESOURCE USER INTERFACE

BACKGROUND

Conventional computer diagnostic tools display information corresponding to system resources, such as a processor and a memory, one system resource at a time. For example, a typical task-manager application may display information about processor performance separately from information about memory usage. Thus, conventional computer diagnostic tools make it difficult for users to compare overall system resource usage to determine the cause of a performance problem.

SUMMARY

This document describes techniques for presenting a resource user interface. These techniques present, in a summary section of a user interface, multiple selectable resource tiles that each include real-time and/or static information corresponding to one of multiple resources of a computing device. Each of the multiple selectable resource tiles are presented simultaneously, which enables a user to compare live, real-time resource usage for different resources of the computing device. Further, these techniques present, in a detailed view section of the user interface, additional real-time resource information and/or a real-time resource graph corresponding to a selected one of the multiple resources.

This summary is provided to introduce simplified concepts for a resource user interface that are further described below in the Detailed Description and/or shown in the Figures. This summary is not intended to identify essential features of the claimed subject matter, nor is it intended for use in determining the scope of the claimed subject matter. The term "techniques" as used herein can include devices, systems, apparatuses, operations, and/or methods as permitted by the context in which the term is used.

BRIEF DESCRIPTION OF THE DRAWINGS

Embodiments for a resource user interface are described with reference to the following drawings. The same numbers are used throughout the drawings to reference like features and components.

DETAILED DESCRIPTION

Overview

This document describes techniques for presenting a resource user interface. These techniques present, in a summary section of a user interface, multiple selectable resource tiles that each include real-time and/or static information corresponding to one of multiple resources of a computing device. Each of the multiple selectable resource tiles are presented simultaneously, which enables a user to compare live, real-time resource usage for different resources of the computing device. Further, these techniques present, in a detailed view section of the user interface, additional real-time resource information and/or a real-time resource graph corresponding to a selected one of the multiple resources.

The resource user interface may be presented in a performance tab of a task manager user interface or as a stand-alone user interface. A user can access the resource user interface to diagnose a performance problem of the user's computing device. As an example, the user may notice that the computing device is operating slowly, which may be caused by applications using too much of the central processing unit (CPU) or using too much of the memory of the computing device. The resource user interface enables the user to compare real-time usage of both the CPU and the memory at the same time to quickly and easily determine whether the CPU or the memory is causing the computing device to operate slowly.

While techniques for presenting a resource user interface can be implemented in any number of different devices, systems, environments, and/or configurations, example embodiments for presenting a resource user interface are described in the context of the following example devices, systems, and methods.

Example System

Figure 1:
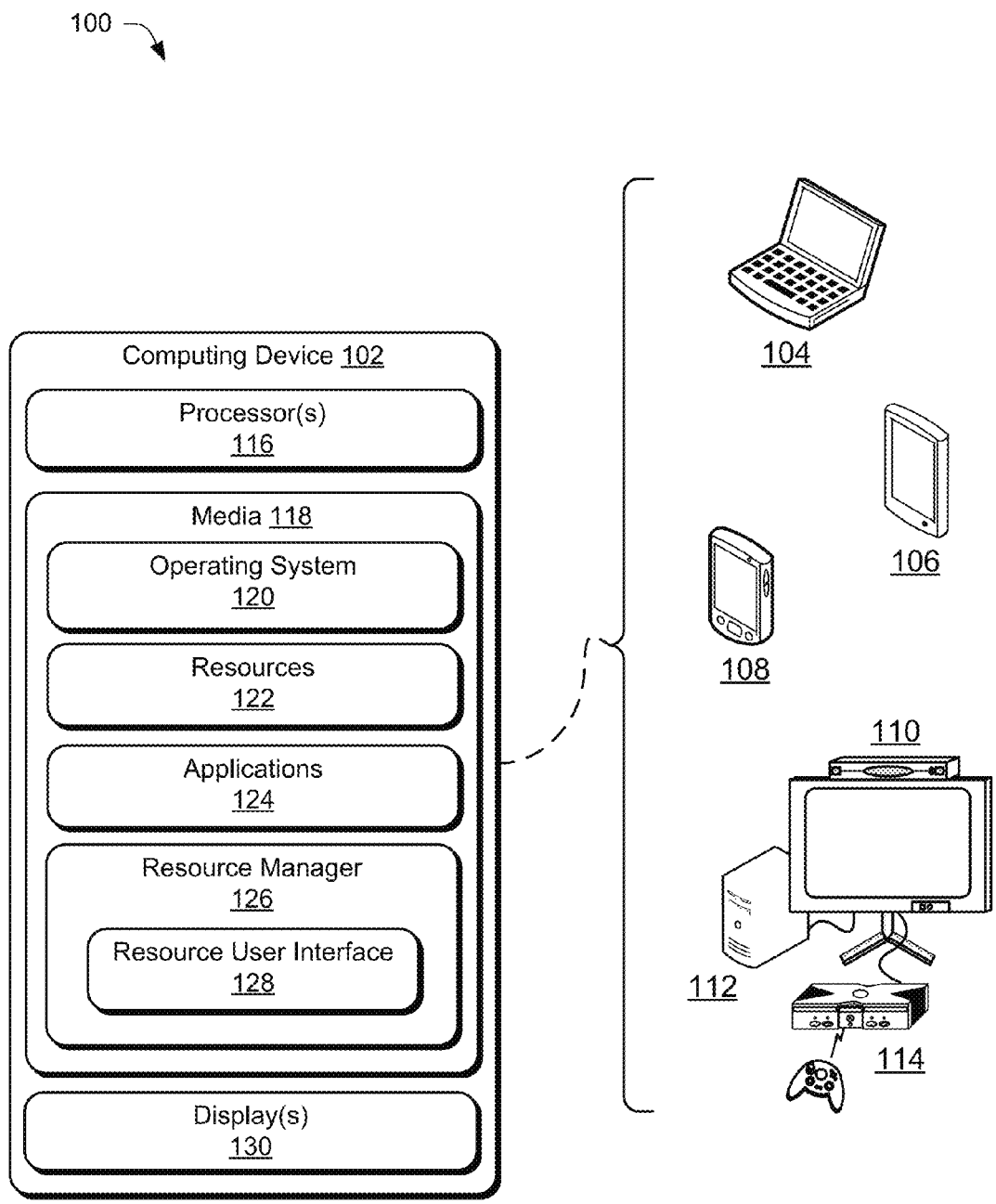
FIG. 1 illustrates an example system in which techniques for presenting a resource user interface can be implemented.

FIG. 1 illustrates an example system 100 in which techniques for a resource user interface can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, resources 122, applications 124, and a resource manager 126. As described herein, resources 122 include any type of computer system resource, such as processors 116 (which includes a central processing unit (CPU)), media 118 (which includes a memory or any type of storage disk or spinning media), networks (such as a Wi-Fi connection), and/or a graphical processing unit (GPU). Applications 124 include applications, or processes, that use or utilize resources 122. For example, a word processing application uses processing resources and memory resources.

Resource manager 126 receives information corresponding to resources 122 and enables access to this information. As described in more detail below, this information may include both static information and real-time information. Static information includes information corresponding to the hardware capabilities or specifications of resource 122. For example, static information for a CPU may include the processor speed and manufacturer of the CPU. Real-time, or dynamic, information includes information corresponding to real-time usage of resource 122. For example, real-time information for a CPU may include a current core speed of the CPU or a portion of the CPU that is currently being utilized. As another example, real-time information for a memory may include the portion of the memory that is currently being used.

Resource manager 126 includes or has access to resource user interface 128, which presents the real-time and static information corresponding to resources 122, and enables interaction with this information. Computing device 102 also includes or has access to one or more displays 130, four examples of which are illustrated in FIG. 1. Operating system 120 and resource manager 126 can be separate from each other or combined or integrated in some form. Thus, in some cases operating system 120 includes resource manager 126.

Example Methods

This document now describes example methods of presenting a resource user interface. These methods are shown as sets of blocks that specify operations performed, but are not necessarily limited to the order shown. Portions of the following discussion reference system 100 of FIG. 1, reference to which is made for example only.

Figure 2:
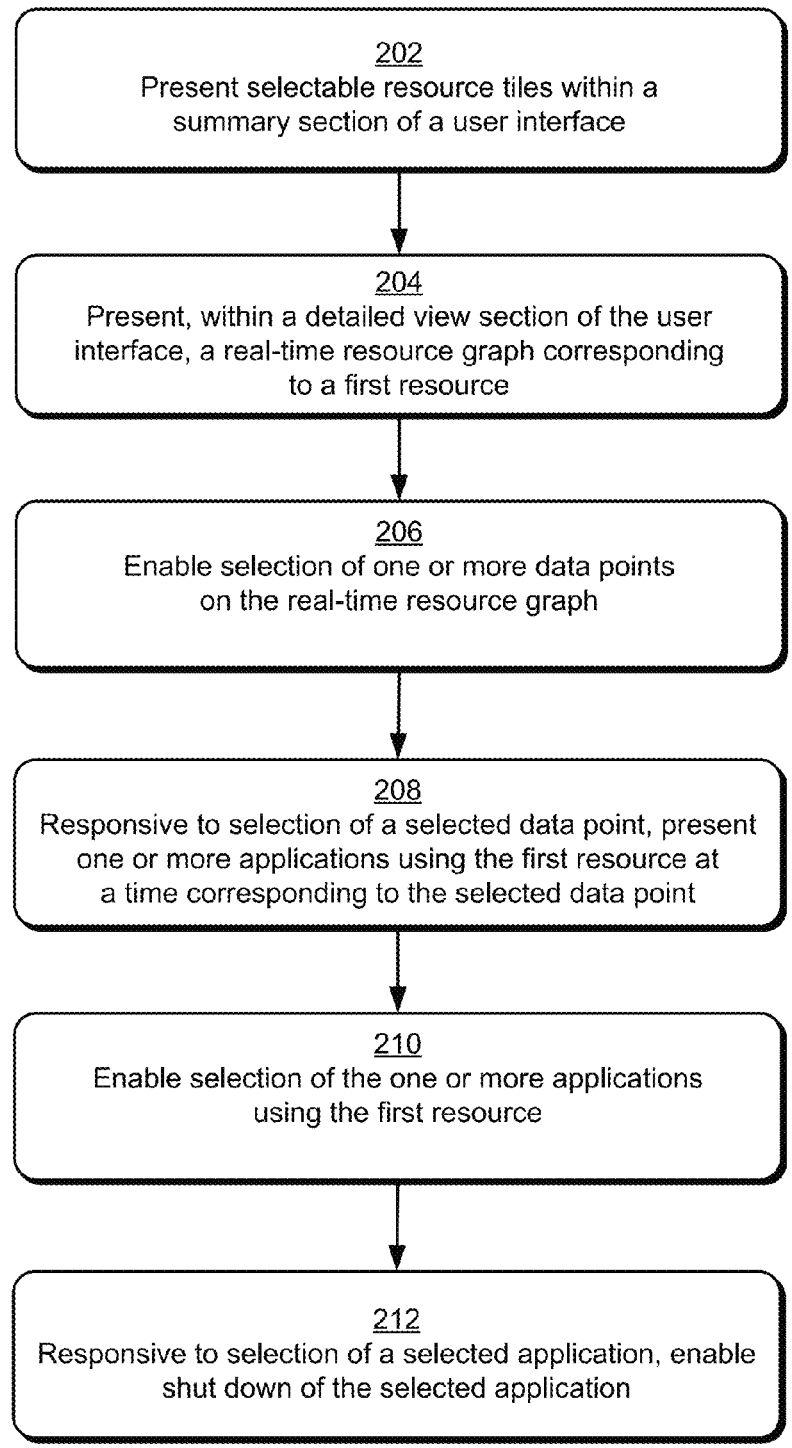
FIG. 2 illustrates an example method for presenting a resource user interface.

FIG. 2 depicts a method 200 for presenting a resource user interface. Block 202 presents selectable resource tiles within a summary section of a user interface. The selectable resource tiles include real-time and/or static information corresponding to resources of computing device 102. Each of the selectable resource tiles are presented simultaneously, which enables a user to compare live, real-time resource usage for a plurality of different resources of computing device 102.

Figure 3:
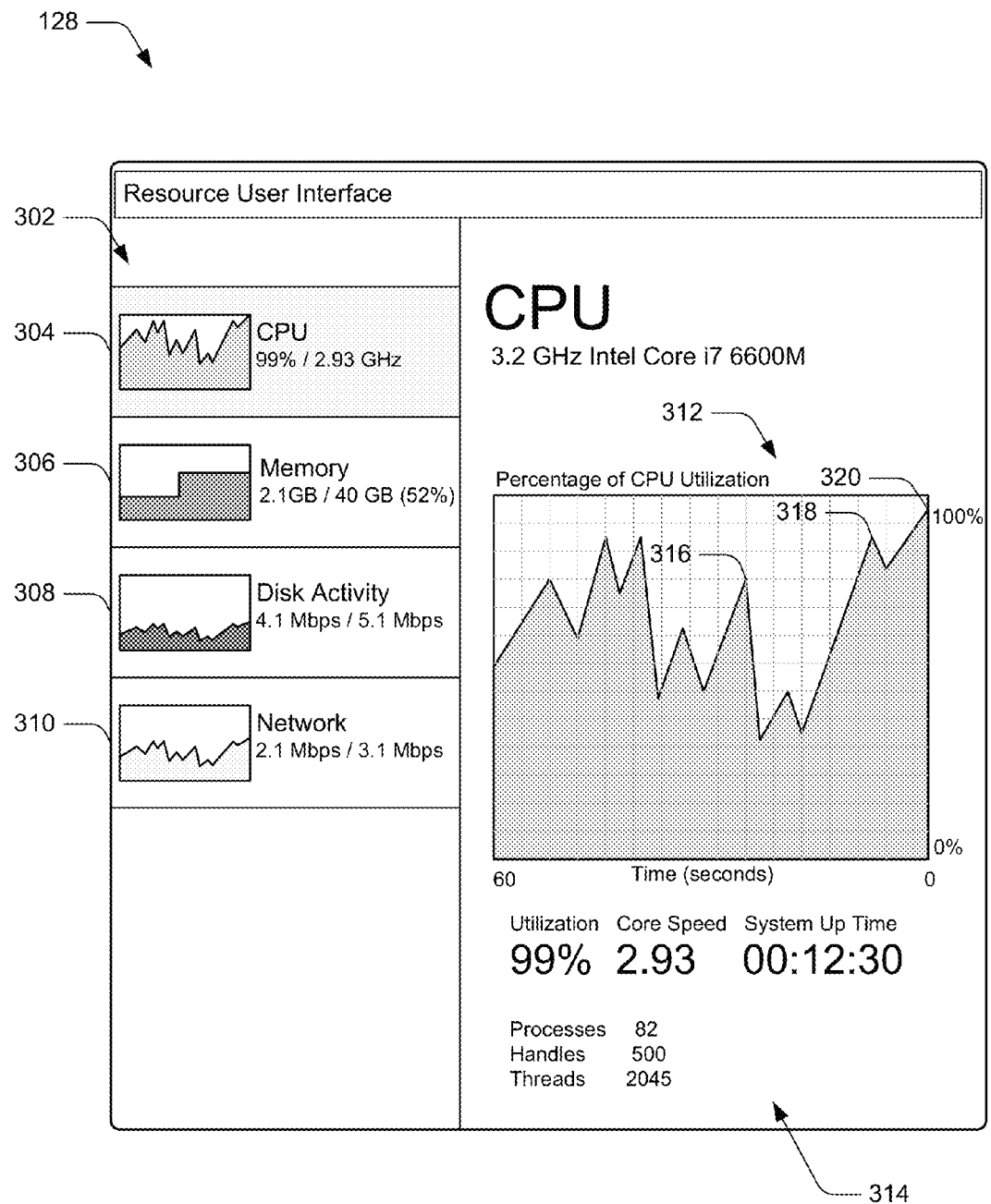
FIG. 3 illustrates an example resource user interface having a summary section and a detailed view section.

By way of example, consider FIG. 3, which illustrates a detailed example of resource user interface 128 (FIG. 1). In this detailed example, resource manager 126 presents a resource user interface 128 that includes a summary section 302 having four selectable resource tiles 304, 306, 308, and 310. Each of these resource tiles includes real-time information corresponding to the resource 122 represented by the tile. In some embodiments, these resource tiles may also include static information corresponding to the resource 122 represented by the tile. Resource tiles 304, 306, 308, and 310 are just one example of resource tiles, other example of resource tiles includes the name of a represented resource, or any other type of symbol or shape that represents a resource and includes information corresponding to the represented resource.

In this example, resource tile 304 is directed to a CPU resource of computing device 102. Tile 304 presents real-time, or live, information corresponding to usage of the CPU, which in this example includes information indicating that the core speed of the CPU is 2.93 GHz and that 99% of the CPU is being utilized by one or more applications 124. Additionally, tile 304 includes a real-time resource graph that indicates a portion or a percentage of the CPU being utilized over various time periods. The real-time resource graph in resource tile 304 is just one example of a real-time resource graph. Other examples of the real-time resource graph include pie charts, bar charts, histograms, and any other type of graph, chart, or diagram that indicates resource usage.

Resource tile 306, in this example, is directed to a memory resource of computing device 102. Tile 306 includes real-time information corresponding to the memory resource, which in this case includes information indicating that 2.1 gigabytes of a total of 4.0 gigabytes of memory is being used by one or more applications 124, which is 52% of the available memory. Additionally, tile 306 includes a real-time resource graph that indicates a portion of the memory being utilized over various time periods.

Similarly, resource tile 308, in this example, is directed to a disk (e.g., storage disk or spinning media) of computing device 102 and includes real-time information corresponding to the disk as well as a real-time resource graph that indicates a portion of the disk being utilized over various time periods. Similarly, resource tile 310, in this example, is directed to a network connection (e.g., a Wi-Fi or wired network connection) of computing device 102 and includes real-time information corresponding to the network connection as well as a real-time resource graph that indicates a portion of the network bandwidth being utilized over various time periods.

Selectable resource tiles 304, 306, 308, and 310 are examples of just a few of the possible resource tiles that resource manager 126 can present in the summary section 302 of user interface 128. In an embodiment, resource manager 126 can present one selectable resource tile for each hardware resource and/or physical device that is connected to computing device 102. For example, if a computing device has four different disks, resource manager 126 presents a resource tile for each of the four different disks in summary section 302. As another example, if a computing device has more than one network connection (e.g., a wired and a wireless connection), resource manger 126 presents a resource tile for each of the different network connections in summary section 302. In an embodiment, resource manager 126 is configured to present reduced visuals of the resource tiles to optimize performance. For example, if more than four different resource tiles are presented, resource manager 126 may remove presentation of the real-time resource graph from the selectable resource tiles.

Note, therefore, that resource manager 126 presents summary section 302 of user interface 128 to enable a user to quickly compare live, real-time resource usage across a plurality of different resources 122 of computing device 102. This enables the user to diagnose a likely cause of a performance problem. Consider a case where a user notices that computing device 102 is running slowly. After accessing user interface 128, the user can quickly and easily determine that the CPU is being heavily utilized and is likely the cause of the poor performance of computing device 102. The user can then troubleshoot the problem by investigating the reasons for the CPU's heavy usage, which is described in more detail below.

Block 204 presents, within a detailed view section of the user interface, a real-time resource graph corresponding to a first resource. Resource manager 126 may present the real-time resource graph in response to receiving a selection of the selectable resource tile that corresponds to the first resource. By way of example, assume that a user wants to see more information regarding the CPU. To do so, the user selects, such as through a mouse click or tap gesture, selectable resource tile 304 corresponding to the CPU. In response, resource manager 126 presents a real-time resource graph 312 associated with the CPU in a detailed view section 314 of user interface 128. Various types of real-time resource graphs may be presented. For example, the resource graph may present overall CPU utilization, utilization by each logical processor of computing device 102, or utilization by each non-uniform memory access (NUMA) node. Resource manager 126 can scale graph 312 to the number of logical processors on computing device 102. Alternately, resource manager 126 may present real-time resource graph 312 when user interface 128 is opened as a default view. Note that the first resource may correspond to any resource 122, such as processors 116 (which includes a CPU), media 118 (which includes a memory or any type of storage disk or spinning media), networks (such as a Wi-Fi connection), or a GPU, to name just a few.

In various embodiments, resource manager 126 also presents static information and/or real-time information corresponding to the resource in detailed view section 314. For example, static information for the CPU may include the processor speed and the manufacturer of the CPU, which in this example is that the CPU is a 3.2 GHz Intel Core i7 6600M processor. Real-time information includes information corresponding to real-time usage of a resource. Resource manager 126 may present both the real-time information that is presented in summary section 302, as well as additional real-time information. The additional real-time information may be more detailed than the real-time information presented in summary section 302.

In this example, detailed view section 314 includes the real-time information that is presented in selectable resource tile 304, which includes that 99% of the CPU is being utilized and that the core speed is 2.93 GHz. In addition, detailed view section 314 includes additional real-time information that is not included in resource tile 304, which includes that the system time is 00:12:30 and that there are 82 processes, 500 handles, and 2045 threads currently being processed by the CPU. Note, therefore, that the selectable resource tiles provide a summary, or a subset, of the real-time information that is presented in detailed view section 314 of user interface 128.

In this example, real-time resource graph 312 is a larger version of the real-time resource graph presented in selectable resource tile 304, and similarly indicates a portion of the selected resource being utilized at a current time and over a previous time period. Graph 312 presents a percentage of the resource being used at a current time at the far right of the graph, and presents a percentage of the resource being used over a previous time period of 60 seconds. Graph 312 may be moving or paused. When graph 312 is paused, the user is presented with a static graph that does not change. Alternately, when graph 312 is moving, the user is presented with a continuously updating graph showing current resource usage. Graph 312 is just one example of a real-time resource graph. Other examples of real-time resource graph include pie charts, bar charts, histograms, and any other type of graph, chart, or diagram that indicates resource usage. In some embodiments, the detailed view section may include more than one real-time resource graph, such as a graph similar to graph 312 along with a bar chart that indicates other resource information.

Detailed view section 314 is just one example of the detailed view section of resource user interface 128. Generally, the information contained in detailed view section 314 is more detailed than the information contained in summary section 302. Thus, detailed view section 314 can include any configuration and type of information corresponding to a resource 122 that pertains to one of the selectable resource tiles in summary section 314 of resource user interface 128. For example, detailed view section 314 may include one or more real-time resource graphs without any additional real-time information or static information. Alternately, detailed view section 314 may include real-time information and/or static information without a real-time resource graph. In FIG. 3, summary section 302 and detailed view section 314 are presented in the same window of resource user interface 128. Alternately, summary section 302 and detailed view section 314 may be presented in different windows of resource user interface 128.

Block 206 enables selection of one or more data points on the real-time resource graph. For example, one or more data points of real-time resource graph 312 are selectable, such as example data points 316, 318, and 320. A user can select one of the data points of real-time resource graph 312 to view information regarding applications 124 or processes that are using the resource at a time period corresponding to the selected data point, as described in more detail below.

Figure 4:
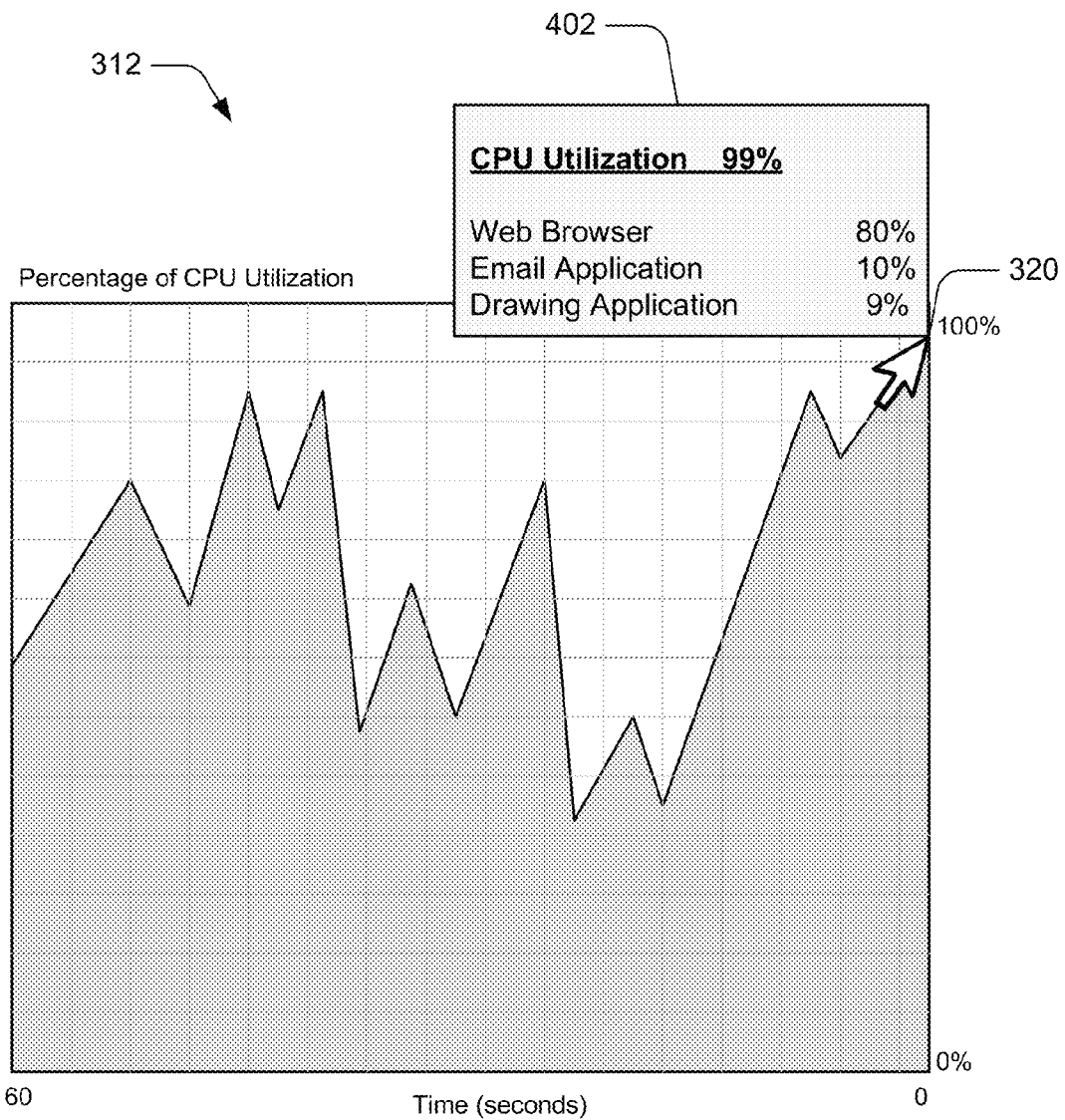
FIG. 4 illustrates a larger view of a real-time resource graph illustrated in the interface of FIG. 3.

Block 208, responsive to selection of a selected data point, presents one or more applications using the first resource at a time corresponding to the selected data point. By way of example, consider FIG. 4, which illustrates real-time resource graph 312 when a data point in the graph is selected. In this example, a user selects data point 320, such as by clicking, double clicking, tapping, or moving a cursor and hovering over data point 320. Responsively, resource manager 126 presents a list 402 of one or more applications 124 using the first resource at the time corresponding to selected data point 320.

In this example, list 402 indicates that the total CPU utilization at the time corresponding to data point 320 is 99%. In addition, list 402 presents three applications that are using the resource at the time corresponding to data point 320, along with a portion or a percentage of the selected resource that each of the applications are using. In this example, a Web browser application is using 80% of the CPU, an email application is using 10% of the CPU, and a drawing application is using 9% of the CPU at the time corresponding to selected data point 320.

While list 402 is illustrated as a list of three different applications that are using the resource, it is to be appreciated that any number of applications and/or processes using the resource may be listed in list 402. In addition, list 402 may be embodied as a chart (e.g., a pie chart) or any other type of visual representation that indicates applications and/or processes that are using the resource.

Block 210 enables selection of the one or more applications using the first resource. For example, resource manager 126 may enable selection of the one or more applications in list 402. In this example, a user may click on the web browser application in list 402 because the web browser is using 80% of the CPU.

Block 212, responsive to selection of a selected application, enables shut down of the selected application. Continuing with the example above, when the user selects the web browser application from list 402, resource manager 126 may present the user with a list of actions regarding the selected application. For example, resource manager 126 may enable the user to shut down the web browser. Alternately or in addition, resource manager 126 may enable the user to further investigate the web browser application to determine the reason that the web browser is using 80% of the CPU. Alternately or in addition, resource manager 126 may switch to an application or process view to see all of the currently running applications and/or processes.

Note that detailed view section 314 is just one example of a detailed view section that corresponds to a CPU. In addition, detailed view sections may be presented for memory usage, disk activity, network connections, and any other type of resource of computing device 102. For example, if a user selects a second selectable resource tile, such as selectable resource tile 306, resource manager 126 presents real-time information, static information, and/or a real-time resource graph corresponding to the memory of computing device 102 in detailed view section 314. Similarly, if the user selects selectable resource tile 308, resource manager 126 presents real-time information, static information, and/or a real-time resource graph corresponding to the disk activity of computing device 102 in detailed view section 314. Similarly, if the user selects selectable resource tile 310, resource manager 126 presents real-time information, static information, and/or a real-time resource graph corresponding to the network connection of computing device 102 in detailed view section 314.

In accordance with various embodiments, the layout of the real-time information, the static information, and the real-time resource graph in detailed view section 314 is consistent for each resource 122. For example, the layout of detailed view section for the memory, the disk activity, and the network connection is similar to the layout of detailed view section 314 for the CPU in FIG. 3.

The preceding discussion describes a method in which the techniques may operate to present a resource user interface. Aspects of these methods may be implemented in hardware (e.g., fixed logic circuitry), firmware, software, manual processing, or any combination thereof. A software implementation represents program code that performs specified tasks when executed by a computer processor. The example methods can be performed through computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

By way of example, these techniques may be embodied on one or more of the entities shown in system 100 of FIG. 1 and/or example device 500 described below, which may be further divided, combined, and so on. Thus, system 100 and/or device 500 illustrate some of many possible systems or apparatuses capable of employing the described techniques. The entities of system 100 and/or device 500 generally represent software, firmware, hardware, whole devices or networks, or a combination thereof. In the case of a software implementation, for instance, the entities (e.g., resource manager 126 and resource user interface 128) represent program code that performs specified tasks when executed on a processor (e.g., processor(s) 116). The program code can be stored in one or more computer-readable memory devices, such as computer-readable storage media 118 or computer-readable media 514 of FIG. 5.

Example Device

Figure 5:
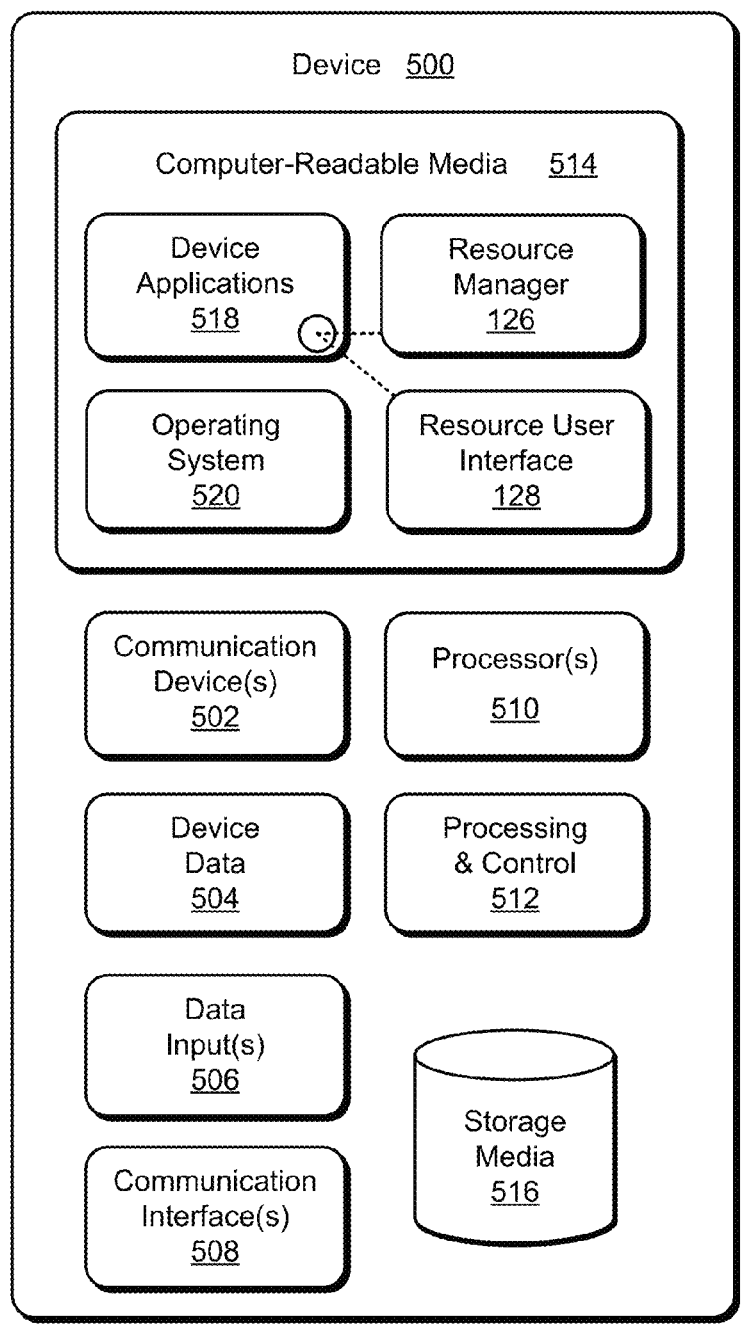
FIG. 5 illustrates an example device in which techniques for presenting a resource user interface can be implemented.

FIG. 5 illustrates various components of an example device 500 that can be implemented as any of the devices, or services and operations implemented by the devices, described with reference to the previous FIGS. 1-4. In some embodiments, device 500 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 500 may also be associated with a user (e.g., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508, which can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like), which process various computer-executable instructions to control the operation of device 500 and for grouping selectable tiles. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable storage media 514, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable storage media 514 provides data storage mechanisms to store the device data 504, as well as various device applications 518 and any other types of information and/or data related to operational aspects of device 500. For example, an operating system 520 can be maintained as a computer application with the computer-readable storage media 514 and executed on processors 510. The device applications 518 may include a device manager, such as any form of a control application, software application, signal-processing and control module, code that is native to a particular device, a hardware abstraction layer for a particular device, and so on.

The device applications 518 also include any system components or modules to implement techniques for presenting a resource user interface. In this example, the device applications 518 can include resource manager 126 and resource user interface 128.

Conclusion

Although embodiments of techniques and apparatuses for presenting a resource user interface have been described in language specific to features and/or methods, the appended claims are not necessarily limited to the specific features or methods described. Rather, the specific features and methods are disclosed as example implementations for a resource user interface.

What is claimed is:
1. A computer-implemented method comprising:
 presenting selectable resource tiles within a summary section of a user interface, the selectable resource tiles each corresponding to real-time usage of resources of a single computing device and including a selectable resource tile for each of a central processing unit (CPU) of the computing device, a memory of the computing device, a storage disk of the computing device, and a network connection of the computing device, each of the selectable resource tiles displaying static information and real-time information for the corresponding resource, the real-time information including a real-time resource graph for the corresponding resource, the selectable resource tiles presented concurrently within the summary section to enable comparison of live, real-time resource usage of the CPU, the memory, the storage disk, and the network connection of the computing device;

presenting, within a detailed view section of the user interface, an additional real-time resource graph corresponding to the resource of a selected one of the selectable resource tiles, the additional real-time resource graph comprising a larger version of the real-time resource graph displayed in the selected selectable resource tile, each of the selectable resource tiles selectable to cause presentation of the additional real-time resource graph corresponding to the selected selectable resource tile, each of the additional real-time resource graphs comprising a moving graph that is continuously updated in real-time to show current resource usage;

enabling selection of one or more data points on the additional real-time resource graph associated with the CPU, and responsive to selection of a selected data point, presenting a list that includes a total percentage of the CPU being used by at least two applications and indications of a first percentage of the CPU being used by a first one of the at least two applications and a second percentage of the CPU being used by a second one of the at least two applications at a time corresponding to the selected data point; and enabling selection of each of the at least two applications using the first resource from the list, and responsive to selection of a selected application, enabling shut down of the selected application.

2. A computer-implemented method as described in claim 1, wherein the detailed view section further includes the real-time information corresponding to the resource of the selected selectable resource tile, additional real-time information corresponding to the resource of the selected selectable resource tile, and the static information corresponding to the resource of the selected selectable resource tile.

3. A computer-implemented method as described in claim 1, wherein the real-time resource graph presents a portion of the resource of the selectable resource tile that is being utilized at a current time and over a previous time period.

4. The computer-implemented method of claim 1, wherein the list is presented concurrently with the additional real time resource graph associated with the CPU.

5. A computing device comprising:
at least a hardware processor and a memory to implement a resource user interface, the resource user interface comprising:
a detailed view section that presents a real-time resource graph corresponding to a central processing unit (CPU) of the computing device, the real-time resource graph:
   presenting a portion of the CPU that is being utilized at a current time and over a previous time period; and
   presenting, in a list, two or more applications consuming the CPU at a specific time and a percentage of the CPU that each of the two or more applications are consuming at the specific time responsive to selection of the specific time on the real-time resource graph, wherein the list is configured to receive a selection of each of the two or more applications in order to shut down the selected application; and
a summary section presenting a first resource tile that includes static information and real-time information corresponding to the CPU, a second resource tile that includes static information and real-time information corresponding to a memory of the computing device, a third resource tile that includes static information and real-time information corresponding to a storage disk of the computing device, and a fourth resource tile that includes static information and real-time information corresponding to a network connection of the computing device, wherein selection of the second, third, or fourth resource tile causes the detailed view section to present a real-time resource graph corresponding to the resource of the selected second, third, or fourth resource tile, the first, second, third, and fourth real-time resource tiles presented concurrently in the summary section to enable comparison of live, real-time resource usage of the CPU, the memory, the storage disk, and the network connection of the computing device.

6. The computing device as described in claim 5, wherein the detailed view section further presents the real-time information and the static information corresponding to the CPU when the first resource tile is selected.

7. The computing device as described in claim 5, wherein the summary section is configured to present one or more additional resource tiles for one or more hardware resources that are connected to the computing device.

8. The computing device as described in claim 5, wherein the list and the real-time resource are presented concurrently.

9. The computing device as described in claim 5, wherein the real-time resource graph comprises a moving graph that is continuously updated in real-time to show current usage of the CPU.

10. A system comprising:
one or more hardware processors; and
one or more memories comprising instructions stored thereon that, responsive to execution by the one or more hardware processors, perform operations comprising:
   presenting selectable resource tiles within a summary section of a user interface, the selectable resource tiles each corresponding to real-time usage of resources of a single computing device and including a selectable resource tile for each of a central processing unit (CPU) of the computing device, a memory of the computing device, a storage disk of the computing device, and a network connection of the computing device, each of the selectable resource tiles displaying static information and real-time information for the corresponding resource, the real-time information including a real-time resource graph for the corresponding resource, the selectable resource tiles presented concurrently within the summary section to enable comparison of live, real-time resource usage of the CPU, the memory, the storage disk, and the network connection of the computing device;
   presenting, within a detailed view section of the user interface, an additional real-time resource graph corresponding to the resource of a selected one of the selectable resource tiles, the additional real-time resource graph comprising a larger version of the real-time resource graph displayed in the selected selectable resource tile, each of the selectable resource tiles selectable to cause presentation of the additional real-time resource graph corresponding to the selected selectable resource tile;
   enabling selection of one or more data points on the additional real-time resource graph associated with the CPU, and responsive to selection of a selected data point, presenting a list that includes a total percentage of the CPU being used by at least two applications and indications of a first percentage of the CPU being used by a first one of the at least two applications and a second percentage of the CPU being used by a second one of the at least two applications at a time corresponding to the selected data point; and enabling selection of each of the at least two applications using the first resource from the list, and responsive to selection of a selected application, enabling shut down of the selected application.

11. The system as described in claim 10, wherein the detailed view section further includes the real-time information corresponding to the resource of the selected selectable resource tile, additional real-time information corresponding to the resource of the selected selectable resource tile, and the static information corresponding to the resource of the selected selectable resource tile.

12. The system as described in claim 10, wherein the real-time resource graph presents a portion of the resource of the selectable resource tile that is being utilized at a current time and over a previous time period.

13. The system as described in claim 10, wherein the list is presented concurrently with the additional real time resource graph associated with the CPU.

14. The system as described in claim 10, wherein the real-time resource graph comprises a moving graph that is continuously updated in real-time to show current usage of the CPU.

* * * * *